United States Patent
Ushmaev et al.

(10) Patent No.: US 12,509,405 B2
(45) Date of Patent: Dec. 30, 2025

(54) METHOD OF FORMING PROTECTIVE COATING AND COATED ARTICLE COMPRISING PROTECTIVE COATING

(71) Applicant: ROLLS-ROYCE PLC, London (GB)

(72) Inventors: Dmitrii I Ushmaev, Sterlitamak (RU); Zhirong Liao, Fujian province (CN); Dragos A Axinte, Nottingham (GB); Andrew D Norton, Derby (GB); James Kell, Nottingham (GB); Artem Bogatyrev, Bykovo (RU)

(73) Assignee: ROLLS-ROYCE plc, London (GB)

( * ) Notice: Subject to any disclaimer, the term of this patent is extended or adjusted under 35 U.S.C. 154(b) by 270 days.

(21) Appl. No.: 18/141,562

(22) Filed: May 1, 2023

(65) Prior Publication Data
US 2023/0382816 A1 Nov. 30, 2023

(30) Foreign Application Priority Data
May 27, 2022 (GB) .................................. 2207827

(51) Int. Cl.
*C23C 4/18* (2006.01)
*C04B 41/00* (2006.01)
(Continued)

(52) U.S. Cl.
CPC .......... *C04B 41/86* (2013.01); *C04B 41/0072* (2013.01); *C23C 4/18* (2013.01);
(Continued)

(58) Field of Classification Search
CPC ......... C23C 4/18; C23C 28/04; C23C 28/042; C23C 28/048; C23C 28/30; C23C 28/34;
(Continued)

(56) References Cited

U.S. PATENT DOCUMENTS

| 4,377,371 A | * | 3/1983 | Wisander | ............... | F01D 11/122 |
| | | | | | 415/197 |
| 5,484,980 A | * | 1/1996 | Pratt | ..................... | B23K 26/34 |
| | | | | | 219/121.65 |

(Continued)

FOREIGN PATENT DOCUMENTS

| CN | 113699479 A | 11/2021 |
| EP | 1 283 278 A2 | 2/2003 |

(Continued)

OTHER PUBLICATIONS

Jun. 30, 2023 Extended European Search Report issued in European Patent Application No. 23170250.7.
(Continued)

*Primary Examiner* — Z. Jim Yang
(74) *Attorney, Agent, or Firm* — Oliff PLC

(57) ABSTRACT

A method of forming a protective coating includes providing a substrate including a major surface. The method further includes providing a top coat layer adjacent to the major surface of the substrate. The top coat layer includes a top coat surface distal to the substrate. The method further includes forming a plurality of slots in the top coat layer. The method further includes at least partially heating the top coat surface above a threshold temperature, such that a first portion of the top coat layer extending from the top coat surface partially melts to form a glazed layer, and a second portion of the top coat layer disposed between the glazed layer and the major surface of the substrate is not melted and includes at least a portion of each of the plurality of slots.

9 Claims, 21 Drawing Sheets

(51) Int. Cl.
*C04B 41/86* (2006.01)
*F01D 5/28* (2006.01)

(52) U.S. Cl.
CPC ....... *F01D 5/288* (2013.01); *Y10T 428/24273* (2015.01); *Y10T 428/24314* (2015.01); *Y10T 428/24339* (2015.01)

(58) Field of Classification Search
CPC ... C23C 28/345; C23C 28/3455; C23C 28/36; F01D 5/288; F05D 2230/90; F05D 2230/611; F05D 2230/6111; C04B 41/52; C04B 41/524; C04B 41/526; C04B 41/89
See application file for complete search history.

(56) References Cited

U.S. PATENT DOCUMENTS

| | | | | |
|---|---|---|---|---|
| 5,576,069 A * | 11/1996 | Chen | .......................... | C23C 4/18 427/454 |
| 6,103,315 A * | 8/2000 | Gray | .......................... | C23C 4/18 427/535 |
| 6,316,078 B1 * | 11/2001 | Smialek | ................... | C23C 4/02 428/164 |
| 6,617,003 B1 * | 9/2003 | Lee | .......................... | F01D 5/187 416/241 B |
| 2003/0021905 A1 * | 1/2003 | Lee | .......................... | F01D 5/183 427/402 |
| 2004/0115406 A1 * | 6/2004 | Nagaraj | .............. | C23C 28/3455 428/209 |
| 2005/0013994 A1 * | 1/2005 | Strangman | .......... | C23C 18/1295 427/446 |
| 2007/0026246 A1 * | 2/2007 | Harada | ................. | C23C 28/321 427/446 |
| 2008/0145629 A1 * | 6/2008 | Anoshkina | .............. | F01D 5/288 428/688 |
| 2009/0017260 A1 * | 1/2009 | Kulkarni | ............. | C23C 28/3455 428/161 |
| 2010/0242477 A1 * | 9/2010 | Duval | ..................... | F01D 5/288 427/427 |
| 2012/0167573 A1 * | 7/2012 | Belousov | ............. | C23C 28/345 428/221 |
| 2013/0078428 A1 * | 3/2013 | Bunker | ................... | F01D 5/186 427/532 |
| 2014/0302278 A1 * | 10/2014 | Bunker | ................... | B05D 3/14 428/137 |
| 2015/0147524 A1 * | 5/2015 | Petorak | ................. | C23C 28/042 428/141 |
| 2016/0003052 A1 * | 1/2016 | Shi | .......................... | F01D 5/288 427/256 |
| 2018/0163062 A1 * | 6/2018 | Hoel | ................... | C04B 35/62222 |
| 2019/0211696 A1 * | 7/2019 | Keshavan | ............ | F01D 25/007 |
| 2020/0256201 A1 | 8/2020 | Schaeffer et al. | | |
| 2020/0377990 A1 * | 12/2020 | Li | ....................... | C04B 41/5024 |
| 2021/0140339 A1 * | 5/2021 | Chen | ...................... | F01D 5/288 |
| 2022/0381151 A1 * | 12/2022 | Subramanian | ......... | B33Y 80/00 |
| 2023/0044705 A1 * | 2/2023 | Jackson | ................ | F01D 5/288 |
| 2023/0330700 A1 * | 10/2023 | Wallace | ............. | C09K 11/0822 |

FOREIGN PATENT DOCUMENTS

| | | |
|---|---|---|
| EP | 2431495 A1 | 3/2012 |
| EP | 3 219 696 A1 | 9/2017 |
| WO | 2016/003378 A1 | 1/2016 |

OTHER PUBLICATIONS

Nov. 9, 2022 Search Report issued in British Patent Application No. 2207827.3.

* cited by examiner

METHOD OF FORMING PROTECTIVE COATING AND COATED ARTICLE COMPRISING PROTECTIVE COATING

FIELD OF THE DISCLOSURE

The present disclosure relates to a coated article comprising a protective coating and a method of forming a protective coating.

BACKGROUND

Thermal barrier coatings (TBCs) are often applied on surfaces of high temperature components, e.g., combustion chambers, turbine vanes, blades, etc., of gas turbine engines. Such TBCs may protect the coated components from oxidation at high temperatures and mechanical damage during operation.

Some TBCs typically include a top layer (e.g., a ceramic layer) applied onto a metallic substrate. A bond coat layer, which is a metallic coating, is usually applied between the substrate and the top layer. The top layer generally has a porous microstructure with low resistance to mechanical loads, and thus, prone to damage from foreign objects. Further, due to thermal expansion in general, and thermal expansion coefficient mismatch between the substrate, the bond coat layer, and the top layer, TBCs are prone to spallation, particularly on components that undergo significant thermomechanical changes during operation. Deposition of calcium-magnesium-alumino-silicates (CMAS) products on TBC surfaces also reduces strain tolerance of TBCs, initiating cracks leading to spallation.

Coating spallation may necessitate engine maintenance with coating reapplication. In order to decrease a time-of-flight cost and to reduce a frequency of coating reapplication, TBCs may typically be exposed to after-treatment techniques to improve properties of TBCs after application.

Performance of TBCs may be improved via surface remelting (also known as surface glazing). Surface glazing may generate a dense resolidified microstructure leading to decrease in surface roughness and increase in corrosion/oxidation resistance. Further, erosion due to spallation is generally reduced due to increase in surface microhardness. However, surface glazing may introduce a network of cracks within the TBC perpendicular to the surface. Additionally, external stresses may increase at crack tips. Eventually, the cracks may propagate further and may lead to delamination of the TBC. Moreover, generated cracks are prone to becoming horizontal, which may initiate cohesive top layer spallation. Further, CMAS resistance is believed to be poor since the cracks are narrow in width and may be easily filled with molten CMAS, reducing strain tolerance of the TBC that is exposed to such environmental dust.

In another approach, TBCs are typically provided with a pattern of gaps wide enough such that the molten CMAS may fill the gap but may not completely fill the gap. Further, the TBC may have improved thermal compliance due to the formed gaps, reducing thermal stress accumulation. However, the pattern of gaps may decrease a volumetric thermal insulation of the TBC since the gaps may be filled with hot gases, thereby heating a deeper layer of the TBC. Additionally, the pattern of gaps may increase oxygen diffusion through the TBC that may lead to faster growth of thermally grown oxides (TGOs) at an interface between the bond coat layer and the top layer. Further, generated gaps may represent a surface discontinuity leading to separation of a boundary layer of a flow of gas over the TBC. Thus, an improved coating system is desirable.

SUMMARY OF THE DISCLOSURE

According to a first aspect, there is provided a method of forming a protective coating. The method includes providing a substrate including a major surface. The method further includes providing a top coat layer adjacent to the major surface of the substrate. The top coat layer includes a top coat surface distal to the substrate. The method further includes forming a plurality of slots in the top coat layer. Each slot from the plurality of slots extends at least partially from the top coat surface towards the major surface of the substrate. The method further includes at least partially heating the top coat surface above a threshold temperature, such that a first portion of the top coat layer extending from the top coat surface at least partially melts to form a glazed layer. The method further includes at least partially heating the top coat surface above the threshold temperature, such that a second portion of the top coat layer disposed between the glazed layer and the major surface of the substrate is not melted and includes at least a portion of each of the plurality of slots. The glazed layer includes a glazed external surface. The glazed layer and the second portion of the top coat layer together form the protective coating having a total thickness from the glazed external surface to the major surface of the substrate.

At least partially heating the top coat surface above the threshold temperature may lead to melting of the first portion of the top coat layer to form the glazed layer. Further, the second portion of the top coat layer is not melted and includes at least a portion of each of the plurality of slots. Formation of the plurality of slots in the top coat layer may reduce thermal stress accumulation within the protective coating and may provide a material of the top coat layer with a free space to expand, thereby improving strain (or thermomechanical) tolerance of the protective coating. Further, the protective coating may exhibit increased thermal insulation due to presence of the plurality of slots within the protective coating, covered from the top with the glazed layer, which obstructs heat penetration to the plurality of slots. Deposition of calcium-magnesium-alumino-silicates (CMAS) products within the plurality of slots may be obstructed by the glazed layer, thereby improving CMAS resistance of the protective coating.

Thus, the protective coating of the present disclosure may combine advantages of both the techniques, i.e., surface remelting and segmented coatings (or coatings with gaps/slots). Additionally, the procedure of formation of the plurality of slots in the top coat layer and at least partially heating of the top coat surface may be performed using the same apparatus, e.g., a laser system.

The glazed layer may reduce a surface roughness of the protective coating and may improve its tribological properties. Additionally, the glazed layer may provide a dense surficial layer resistant to erosion and surface damage, thereby improving mechanical properties of the protective coating. Further, the glazed layer may decrease oxygen diffusion through the protective coating due to densification. The glazed layer may further increase reflectance in infrared spectrum range due to densification and reduced surface roughness, thereby improving coating efficiency in terms of radiative heat transfer. In other words, the glazed layer may potentially increase thermal insulation properties of the protective coating against radiation. The glazed layer may further enable a visible change in optical properties of an external surface of the protective coating since the protective coating of the present disclosure may have a glossy, shiny metallic surface, with higher reflectivity in visible spectrum range.

The proposed method may be utilized in an original equipment manufacturer (OEM) facility for producing the protective coating on the major surface of the substrate, or may be utilized during overhauling as a repair/salvage process, or may be utilized on-wing. In the latter case, the proposed method may be used to produce a patch of strain compliant coating on a delaminated component. Additionally, the proposed method may be used to provide strain compliance after a protective coating is deposited on the major surface of the substrate using other techniques. For example, the proposed method may be used to provide strain compliance in a protective coating which has been "sintered" during operation (i.e., columns of the protective coating produced using electron beam physical vapour deposition that have fused together due to environmental conditions, and thus, the strain compliance effect has been lost). This may enhance an operational life of the protective coating by ensuring that the protective coating may remain functional for more cycles.

In some embodiments, the major surface defines a longitudinal axis along a length of the substrate and a transverse axis perpendicular to the longitudinal axis.

In some embodiments, at least one slot from the plurality of slots at least partially extends parallel to the longitudinal axis.

In some embodiments, at least one slot from the plurality of slots at least partially extends parallel to the transverse axis.

In some embodiments, at least one slot from the plurality of slots at least partially extends obliquely relative to the longitudinal axis.

In some embodiments, the major surface of the substrate has a predetermined shape. In some embodiments, the protective coating conforms to the predetermined shape of the major surface. Thus, the protective coating may be aligned with the shape and form of the major surface of the substrate.

In some embodiments, forming the plurality of slots in the top coat layer includes at least one of laser cutting, water jet machining, abrasive machining, photolithography, and milling.

In some embodiments, the laser cutting includes using an ultrashort pulse laser. The ultrashort pulse laser may prevent damage to the substrate if a material of the top coat layer has sufficiently low thermal conductivity. In some examples, the ultrashort pulse laser may be a picosecond laser or a femtosecond laser. In the picosecond regime, ablation rate of underlying bond coat layer (if present) is negligible in comparison to the top coat layer. In other words, it is safe to use lasers with laser pulses equal to or shorter than tens of picoseconds.

In some embodiments, an energy density of the ultrashort pulse laser is less than or equal to about 2 J/mm$^2$. This may induce least amount of thermal damage to the underlying bond coat layer during laser cutting.

In some embodiments, a width of at least one slot from the plurality of slots is greater than or equal to about 1 μm. Width of the at least one slot from the plurality of slots may be determined based on desired strain tolerance of the protective coating.

In some embodiments, the width of the at least one slot from the plurality of slots is less than the total thickness of the protective coating.

In some embodiments, a thickness of the glazed layer from the glazed external surface to the second portion of the top coat layer is greater than or equal to 1 μm. A relatively thicker glazed layer may reduce thermal conductivity and elemental transportation (e.g., oxygen) into the underlying structure of the protective coating.

In some embodiments, the thickness of the glazed layer is less than or equal to 90% of the total thickness of the protective coating.

In some embodiments, a minimum distance between adjacent slots from the plurality of slots is greater than or equal to 10 μm. The minimum distance between adjacent slots may be chosen based on distance between induced cracks in the glazed layer in order to connect the cracks with the plurality of slots. A higher density of slots may be beneficial, allowing to control a density of cracks with smaller width of the cracks.

In some embodiments, the minimum distance between the adjacent slots is less than or equal to 10 times the total thickness of the protective coating.

In some embodiments, the method further includes filling at least one slot from the plurality of slots with a filling material prior to at least partially heating the top coat surface. Thus, the at least one slot from the plurality of slots may be formed with an increased slot width since the at least one slot may be filled with the filling material later. In some examples, the filling material may be a secondary material in the form of a powder, a colloid suspension, or a solution. Thus, the thermomechanical compliance of the protective coating may be improved with the increased slot width. Further, this may enhance CMAS resistance of the protective coating due to reduction of hollow spaces, i.e., the slots being filled with the filling material. Additionally, this may reduce thermal stresses (due to thermally grown oxides) accumulated at the interface between the bond coat layer and the top coat layer due to the plurality of slots being filled with the filling material.

In some embodiments, at least one slot from the plurality of slots extends from the top coat surface to the major surface of the substrate prior to at least partially heating the top coat surface.

In some embodiments, the method further includes providing a bond coat layer between the top coat layer and the major surface of the substrate prior to at least partially heating the top coat surface. The bond coat layer may improve adhesion of the top coat layer to the major surface of the substrate and may also reduce a rate of oxidation of the substrate.

In some embodiments, at least one slot from the plurality of slots extends from the top coat surface to the bond coat layer prior to at least partially heating the top coat surface.

In some embodiments, each slot from the plurality of slots is at least partially defined by a pair of opposing walls of the top coat layer.

In some embodiments, each wall from the pair of walls is perpendicular to the major surface of the substrate.

In some embodiments, at least one wall from the pair of walls is inclined obliquely to the major surface of the substrate by an inclination angle. The inclination angle is less than 90 degrees or greater than 90 degrees. Appropriate geometry of the plurality of slots may be chosen based on desired thermomechanical compliance of the protective coating.

In some embodiments, each of the pair of walls is inclined obliquely to the major surface of the substrate by a corresponding inclination angle.

In some embodiments, the corresponding inclination angles are different from each other.

In some embodiments, the glazed layer includes a plurality of cracks disposed within the glazed layer. Each crack from the plurality of cracks is at least partially aligned with a corresponding slot from the plurality of slots in a plane normal to the major surface of the substrate. A tendency of the crack to become horizontal may be restricted since each crack from the plurality of cracks is arrested at the corresponding slot. Further, a width of the crack may be controlled based on the minimum distance between the adjacent slots.

In some embodiments, a density of the glazed layer is greater than a density of the second portion of the top coat layer. Presence of densified glazed layer may obstruct heat penetration to the plurality of slots and the underlying structure. Further, the glazed layer may provide a dense surficial layer that is resistant to erosion and surface damage along with improved surface roughness of the protective coating.

In some embodiments, at least partially heating the top coat surface further includes heating using a laser. In some embodiments, an energy density of the laser is less than or equal to about 5 J/mm$^2$.

In some embodiments, the laser is a pulsed laser having a pulse duration of at least 1 nanosecond or a continuous wave laser.

In some embodiments, the top coat surface is at least partially heated, such that the first portion of the top coat layer includes a plurality of discrete sections and the second portion of the top coat layer includes a plurality of projecting sections.

Each projecting section from the plurality of projecting sections is disposed between adjacent discrete sections from the plurality of discrete sections. Each projecting section includes a non-glazed external surface disposed adjacent to the glazed external surface. This may allow reduction in a stiffness of the glazed layer since a material of the top coat layer (which may typically be produced through spray deposition) may be more compliant than a material of the glazed layer which is typically denser than the top coat layer.

In some embodiments, the method further includes cutting the glazed layer to generate a plurality of discrete patches, such that the plurality of patches are spaced apart from each other. Cutting the glazed layer to generate the plurality of discrete patches may allow reduction in the stiffness of the glazed layer and/or may allow reduction in a ratio of a horizontal stiffness of the glazed layer to a vertical stiffness of the glazed layer.

In some embodiments, the method further includes heating the glazed layer such that the glazed layer at least partially melts and fills one or more slots from the plurality of slots.

According to a second aspect, there is provided a coated article. The coated article includes a substrate including a major surface. The coated article further includes a protective coating disposed adjacent to the major surface of the substrate. The protective coating includes a top layer disposed adjacent to the major surface of the substrate. The top layer includes a top major surface distal to the major surface of the substrate and a plurality of slots extending at least partially from the top major surface towards the major surface of the substrate. The protective coating further includes a glazed layer disposed directly adjacent to the top major surface of the top layer and including a glazed external surface. The protective coating has a total thickness from the glazed external surface to the major surface of the substrate.

In some embodiments, a density of the glazed layer is greater than a density of the top layer.

In some embodiments, the coated article further includes a bond coat layer disposed between the top layer and the major surface of the substrate.

In some embodiments, the glazed layer includes a plurality of cracks disposed within the glazed layer. Each crack from the plurality of cracks is at least partially aligned with a corresponding slot from the plurality of slots in a plane normal to the major surface of the substrate.

In some embodiments, the major surface defines a longitudinal axis along a length of the substrate and a transverse axis perpendicular to the longitudinal axis.

In some embodiments, at least one slot from the plurality of slots at least partially extends parallel to the longitudinal axis.

In some embodiments, at least one slot from the plurality of slots at least partially extends parallel to the transverse axis.

In some embodiments, at least one slot from the plurality of slots at least partially extends obliquely relative to the longitudinal axis.

In some embodiments, the major surface of the substrate has a predetermined shape. In some embodiments, the protective coating conforms to the predetermined shape of the major surface.

In some embodiments, the glazed layer includes a plurality of discrete sections. The top layer includes a plurality of projecting sections. Each projecting section from the plurality of projecting sections is disposed between adjacent discrete sections from the plurality of discrete sections. Each projecting section includes a non-glazed external surface disposed adjacent to the glazed external surface.

In some embodiments, the glazed layer includes a plurality of discrete patches, such that the plurality of patches are spaced apart from each other.

In some embodiments, the glazed layer at least partially fills one or more slots from the plurality of slots.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Chemical elements are discussed in the present disclosure using their common chemical abbreviations, such as commonly found on a periodic table of elements. For example, hydrogen is represented by its common chemical abbreviation H; helium is represented by its common chemical abbreviation He; and so forth.

Figure 1:
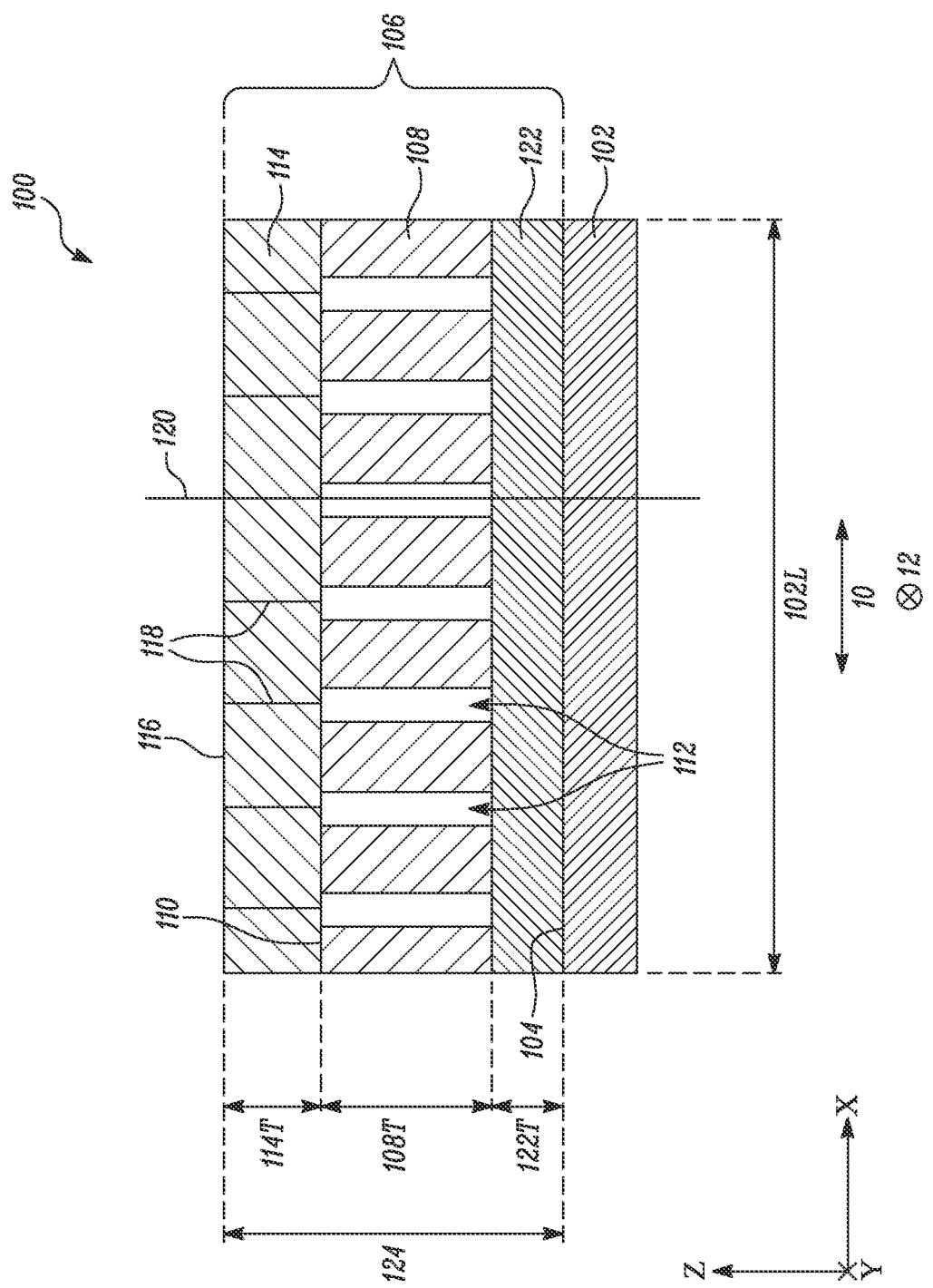
FIG. 1 is a schematic sectional side view of a coated article, according to an embodiment of the present disclosure.

FIG. 1 illustrates a schematic sectional side view of a coated article 100. The coated article 100 defines mutually orthogonal X, Y, and Z-axes. The X and Y-axes are in-plane axes of the coated article 100, and the Z-axis is disposed along a thickness of the coated article 100. In other words, the X and Y-axes are disposed along a plane of the coated article 100, and the Z-axis is perpendicular to the plane of the coated article 100.

In some embodiments, the coated article 100 may be a part or a portion of a gas turbine engine. The coated article 100 includes a substrate 102 including a major surface 104. A portion of the substrate 102 may be shown in FIG. 1 for illustrative purposes. In some embodiments, the substrate 102 may be a high-temperature material, such as a superalloy. However, the substrate 102 may include any material based on application requirements. In some examples, the substrate 102 may include silicon carbide-silicon carbide (SiC—SiC) matrix composites.

In some embodiments, the major surface 104 defines a longitudinal axis 10 along a length 102L of the substrate 102 and a transverse axis 12 perpendicular to the longitudinal axis 10. In some embodiments, the longitudinal axis 10 and the transverse axis 12 are disposed along the plane of the coated article 100. In some embodiments, the longitudinal axis 10 is substantially parallel to the X-axis, and the transverse axis 12 is substantially parallel to the Y-axis.

The coated article 100 further includes a protective coating 106 disposed adjacent to the major surface 104 of the substrate 102. In some embodiments, the protective coating 106 may be a thermal barrier coating (TBC) or an environmental barrier coating (EBC) that protects the substrate 102 from hot gases and may increase an operational life of the substrate by preventing failure due to oxidation and thermomechanical fatigue. As used herein, the terms "TBC", "TBCs", "EBC" or "EBCs", generally refer to stabilized ceramics that may sustain a fairly high temperature gradient such that the substrate 102 (e.g., a metallic component) may be operated at temperatures higher than a melting point of a material of the substrate 102. In some embodiments, the protective coating 106 may be a multi-layered coating. In some embodiments, the coated article 100 may further include one or more layers (e.g., EBCs, TBCs, abradable layers, etc.) above or below the protective coating 106. In some embodiments, the protective coating 106 may cover an entire extent of the major surface 104 in the plane of the coated article 100.

The protective coating 106 includes a top layer 108 disposed adjacent to the major surface 104 of the substrate 102. The top layer 108 has a thickness 108T. In some embodiments, the top layer 108 may include a ceramic material, such as yttria-stabilized zirconia (YSZ), however, any other ceramic material may be utilized. Alternative stabilizers for tetragonal phase in zirconia may include cerium (IV) oxide ($CeO_2$), magnesium oxide (MgO), calcium oxide (CaO), or other oxides. In some embodiments, YSZ may include additional elements such as, but are not limited to, titanium dioxide ($TiO_2$), scandium oxide ($Sc_2O_3$), aluminium oxide ($Al_2O_3$), etc. In some embodiments, multi-layer and composition-graded protective coatings composed of the aforementioned materials may be also utilized.

Other examples of materials for the top layer 108 may include, but are not limited to, gadolinium zirconate ($Gd_2Zr_2O_7$), lanthanum zirconate ($La_2Zr_2O_7$), lanthanum magnesium hexa-aluminate ($LaMgAl_{11}O_{19}$), strontium zirconium trioxide ($SrZrO_3$). The top layer 108 further includes a top major surface 110 distal to the major surface 104 of the substrate 102.

In some embodiments, the top layer 108 may include one or more materials from a group consisting of yttrium monosilicate, yttrium disilicate, rare-earth silicates (both rare-earth monosilicates and rare-earth disilicates), alkaline-earth aluminosilicates, such as barium-strontium-aluminosilicate, niobium oxide, tantalum oxide, zirconium oxide, hafnium oxide, yttrium oxide, titanium oxide, mullite, rare-earth oxides, magnesium-spinel (Mg-spinel), such as magnesium aluminate spinel ($MgAl_2O_4$ spinel), and mixtures and compounds thereof. In some other embodiments, the top layer 108 may include a variety of metal sources including, but are not limited to, aluminium, chromium, tantalum, niobium, silicon, molybdenum, hafnium, titanium, zirconium, platinum, palladium, gold, and mixtures and alloys thereof.

The protective coating 106 further includes a glazed layer 114 disposed directly adjacent to the top major surface 110 of the top layer 108. The glazed layer 114 includes a glazed external surface 116. The glazed layer 114 has a thickness 114T from the glazed external surface 116 to the top layer 108. In some embodiments, the thickness 114T of the glazed layer 114 from the glazed external surface 116 to the top major surface 110 of the top layer 108 may be greater than or equal to 1 micrometre (μm). In some embodiments, a density of the glazed layer 114 is greater than a density of the top layer 108.

In some embodiments, the protective coating 106 further includes a bond coat layer 122 disposed between the top layer 108 and the major surface 104 of the substrate 102. In some embodiments, the bond coat layer 122 may be an oxidation-resistant metallic layer, for example, an aluminium-based layer. In some embodiments, the bond coat layer 122 may include an aluminium containing alloy, such as MCrAlY, where M=Nickel (Ni) and/or Cobalt (Co), or an aluminium-based intermetallic, such as nickel aluminide, containing varying amounts of platinum (Pt) and/or rare earth elements, such as hafnium (Hf). In some embodiments, the bond coat 122 may include silica.

In some embodiments, the top layer 108 or the bond coat layer 122 may be formed using vapour deposition techniques or diffusion-based processes. In some embodiments, the bond coat layer 122 may enhance adhesion of the top layer 108 to the major surface 104 of the substrate 102 and may reduce a rate of oxidation of the substrate 102.

In some embodiments, the bond coat layer 122 may form a thin thermally grown (aluminium) oxide (TGO) layer when the bond coat layer 122 is exposed to oxygen at high temperatures. In some embodiments, YSZ as the top layer 108 is an oxygen-transparent material, i.e., it allows oxygen atoms to penetrate through the top layer 108. These atoms reaching the bond coat layer 122 may chemically react with aluminium to form aluminium oxides ($Al_2O_3$) at the interface between the bond coat layer 122 and the top layer 108 that is generally referred to as the TGO layer. Such a TGO layer may further impede oxidation and hot corrosion of the substrate 102.

The bond coat layer 122 has a thickness 122T from the top layer 108 to the major surface 104 of the substrate 102. Further, the protective coating 106 has a total thickness 124 from the glazed external surface 116 to the major surface 104 of the substrate 102. In other words, the total thickness 124 is equal to sum of the thicknesses 108T, 114T, 122T of the top layer 108, the glazed layer 114, and the bond coat layer 122, respectively. In some embodiments, the bond coat layer 122 may be optional. In such cases, the total thickness 124 of the protective coating 106 is equal to sum of the thicknesses 108T, 114T of the top layer 108 and the glazed layer 114, respectively. In some embodiments, the thickness 114T of the glazed layer 114 is less than or equal to 90% of the total thickness 124 of the protective coating 106.

FIGS. 2A-2D illustrate schematic top views of the top layer 108. Referring to FIGS. 1 and 2, the top layer 108 includes a plurality of slots 112 extending at least partially from the top major surface 110 towards the major surface 104 of the substrate 102. Specifically, as shown in FIG. 1, at least one slot 112 from the plurality of slots 112 extends from the top major surface 110 to the bond coat layer 122. In some embodiments, at least one slot 112 from the plurality of slots 112 extends from the top major surface 110 to the major surface 104 of the substrate 102 when the bond coat layer 122 is not present. In some embodiments, the plurality of slots 112 are disposed throughout the length 102L of the substrate 102.

Figure 2A:
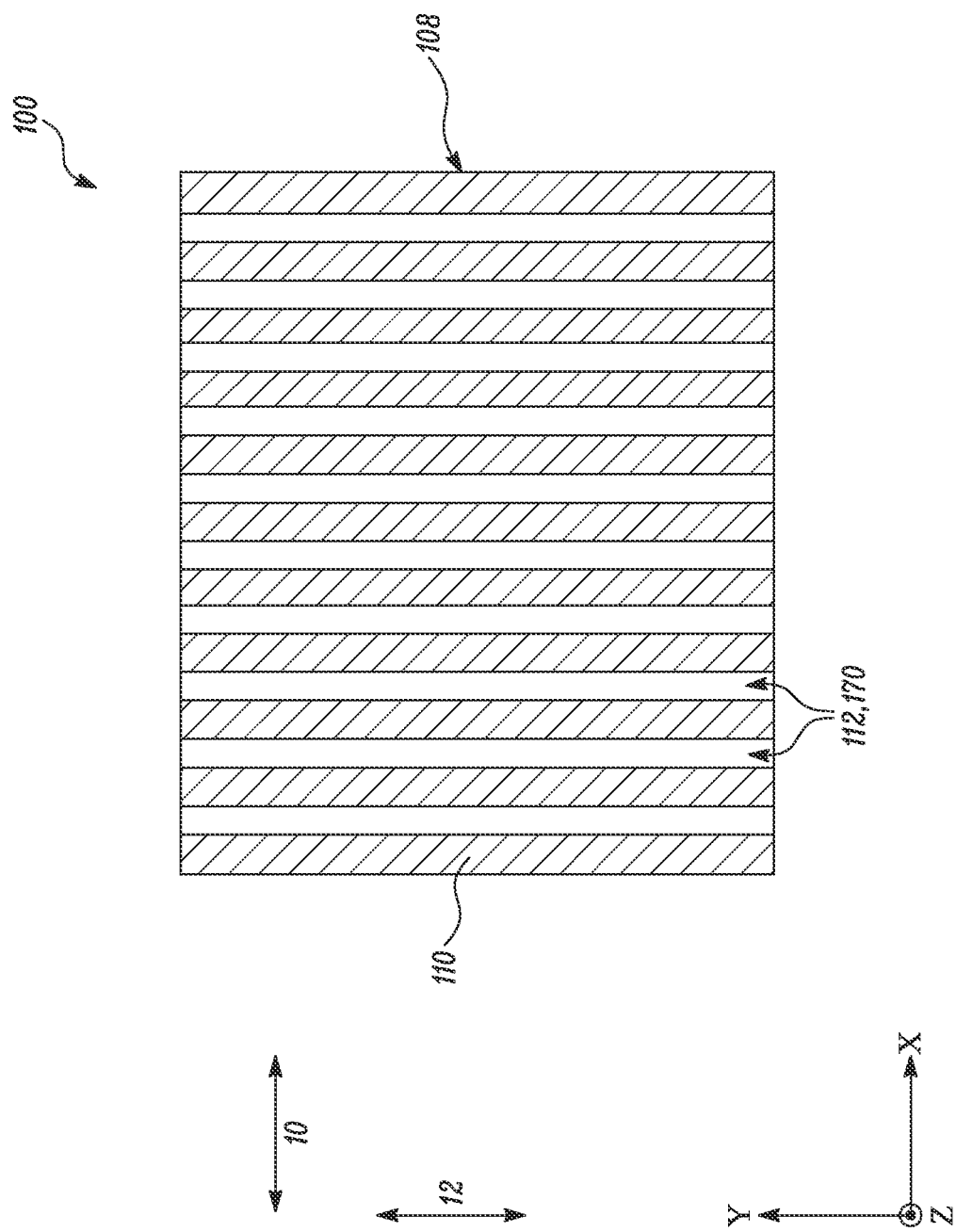
FIGS. 2A-2D are schematic top views of a top layer of the coated article of FIG. 1, according to an embodiment of the present disclosure.

As shown in FIG. 2A, in some embodiments, at least one slot 170 from the plurality of slots 112 at least partially extends parallel to the transverse axis 12 of the major surface 104. In some embodiments, the top layer 108 includes an array of slots 112 extending along the transverse axis 12 of the major surface 104. In some embodiments, the plurality of slots 112 in the top layer 108 may be formed by at least one of laser cutting, water jet machining, abrasive machining, photolithography, and milling.

Figure 2B:
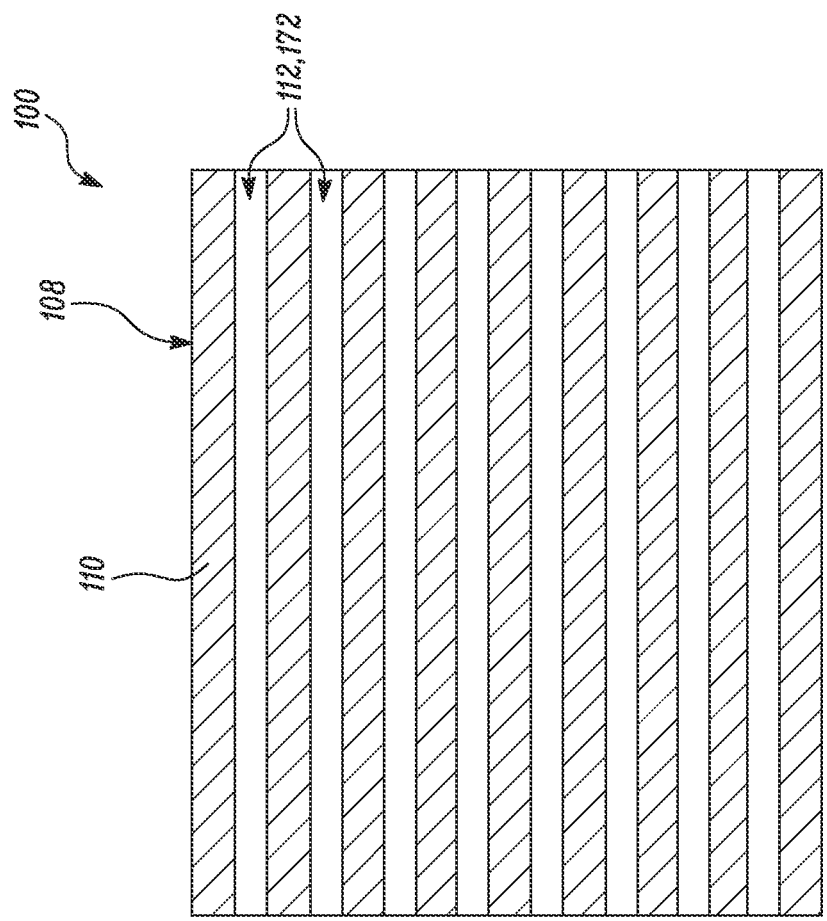
Figure 2B:
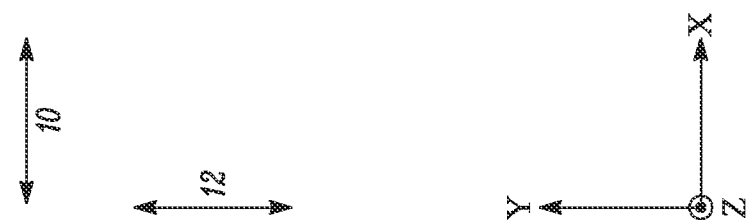

Alternatively, at least one slot 172 from the plurality of slots 112 at least partially extends parallel to the longitudinal axis 10 of the major surface 104 as shown in FIG. 2B. In the illustrated embodiment of FIG. 2B, the coated article 100 includes only the slots 172 that extend parallel to the longitudinal axis 10.

Figure 2C:
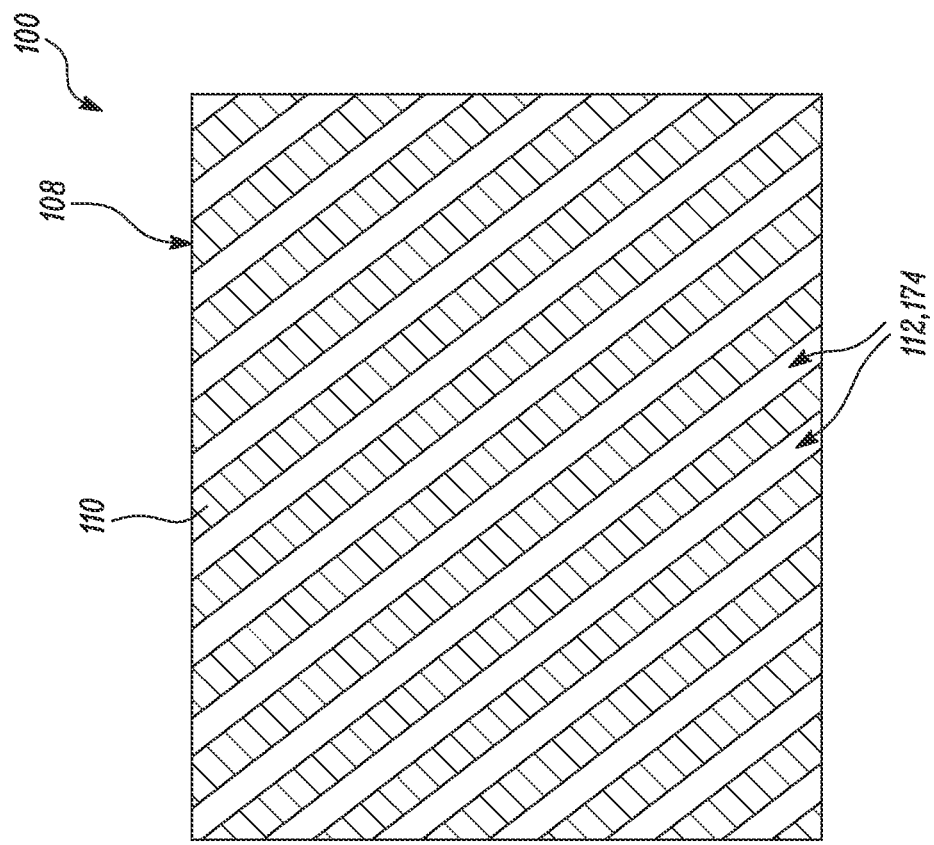
Figure 2C:

Further, in some embodiments, at least one slot 174 from the plurality of slots 112 at least partially extends obliquely relative to the longitudinal axis 10 as shown in FIG. 2C. In the illustrated embodiment of FIG. 2C, the coated article 100 includes only the slots 174 that extend obliquely relative to the longitudinal axis 10.

Figure 2D:
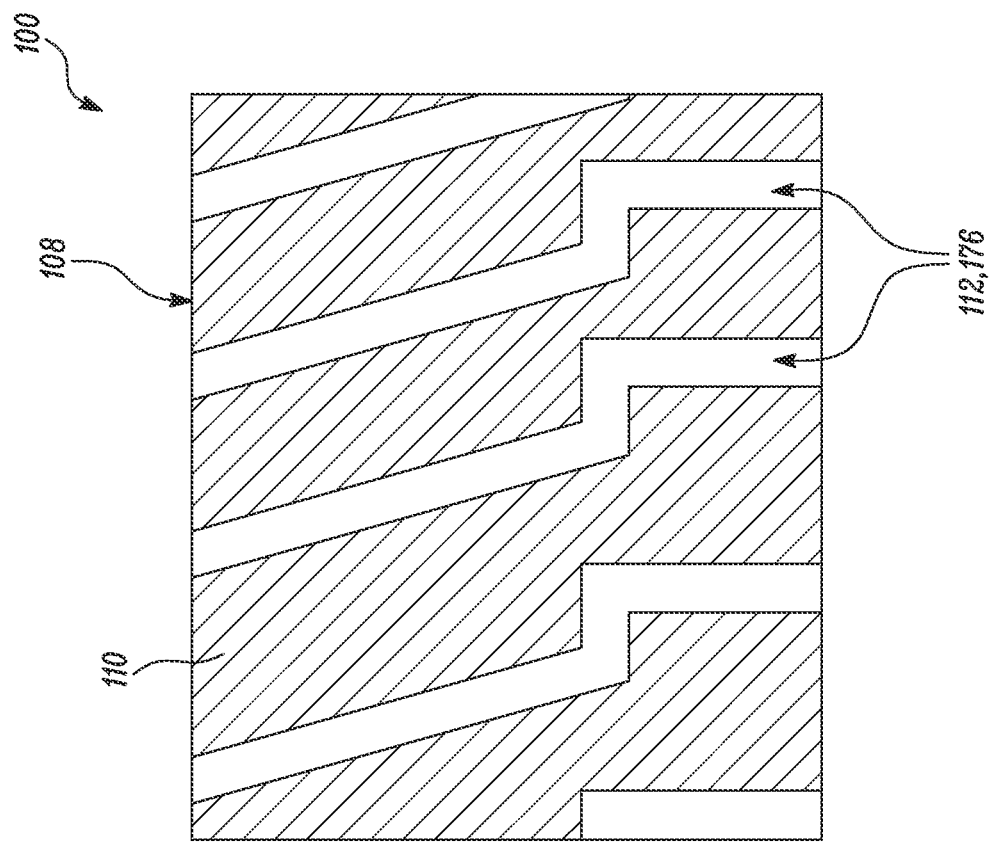
Figure 2D:

It should be understood that the coated article 100 may include any combination of the slots 170, 172, 174. For example, as shown in FIG. 2D, a portion of the slot 176 extends parallel to the transverse axis 12, another portion of the slot 176 extends parallel to the longitudinal axis 10, and another portion of the slot 176 extends obliquely relative to the longitudinal axis 10. Any combination of the slots 170, 172, 174 may be utilized based on application requirements.

In some embodiments, the array of slots 112 may include linear rows of slots 112 or non-linear rows of slots 112 along the transverse axis 12. In some embodiments, the array of slots 112 may include linear rows and columns of slots 112 or non-linear rows and columns of slots 112 in the plane of the top major surface 110. In some embodiments, the array of slots 112 may include a triangular array of slots 112 in the plane of the top major surface 110. In some other embodiments, the array of slots 112 may include a hexagonal array of slots 112 in the plane of the top major surface 110.

Figure 3:
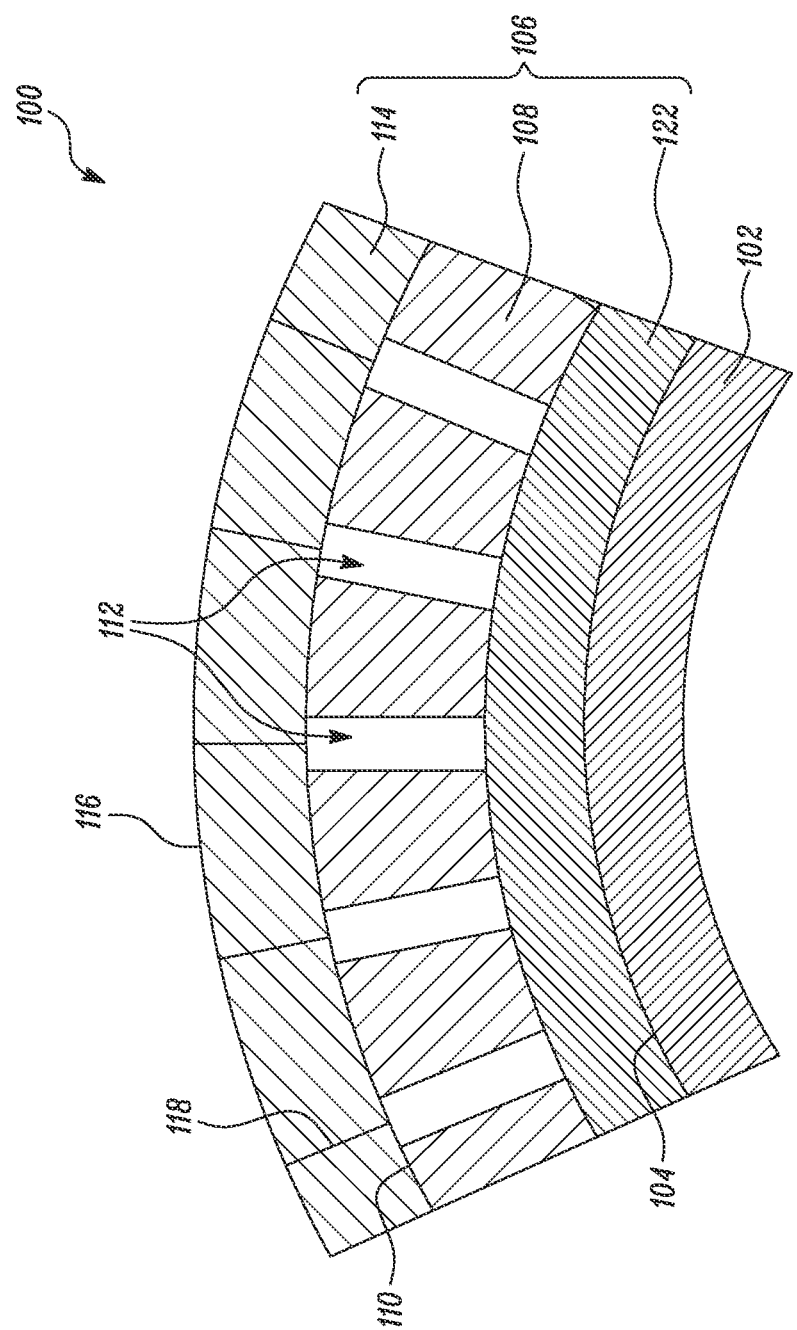
FIG. 3 is a schematic sectional side view of the coated article, according to another embodiment of the present disclosure.

FIG. 3 illustrates a schematic sectional side view of the coated article 100, according to another embodiment of the present disclosure. In the illustrated embodiment of FIG. 3, the major surface 104 of the substrate 102 has a predetermined shape (e.g., an arcuate shape). In some embodiments, the protective coating 106 conforms to the predetermined shape of the major surface 104, and therefore, the protective coating 106 may be a conformal coating. Thus, the protective coating 106 (and the corresponding slots 112) may be aligned with the shape and form of the major surface 104 of the substrate 102. In other words, the major surface 104 of the substrate 102 may have different shapes and geometries based on application requirements and the protective coating 106 may conform to the corresponding shape and geometry of the major surface 104 of the substrate 102.

In the illustrated embodiment of FIG. 1, the plurality of slots 112 have substantially parallel side walls. Alternatively, various geometries of the slots 112 can be possible based on application requirements and some examples are described later in the disclosure. In some embodiments, the slots 112 may have a V-shaped and/or a U-shaped cross-section. It should be understood that the terms "V-shaped" and "U-shaped" describe a general geometry of the slots 112, while allowing for variations within the actual shape so as to not be a perfect V or U shape, respectively.

In some embodiments, the glazed layer 114 includes a plurality of cracks 118 disposed within the glazed layer 114. Each crack 118 from the plurality of cracks 118 is at least partially aligned with a corresponding slot 112 from the plurality of slots 112 in a plane 120 normal to the major surface 104 of the substrate 102. The plane 120 may correspond to the Y-Z plane.

Figure 4A:
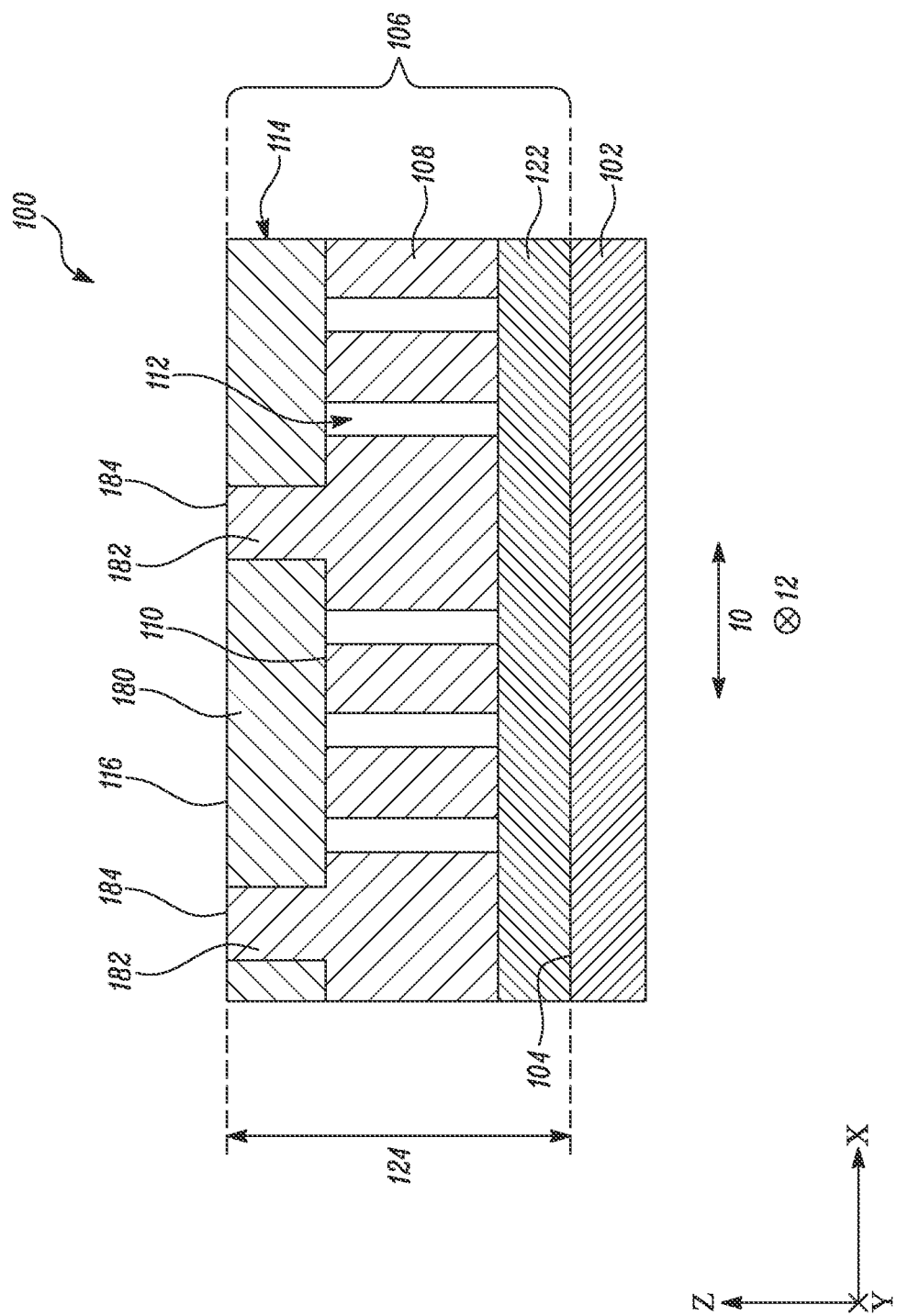
FIGS. 4A-4C are schematic sectional side views of the coated article, according to different embodiments of the present disclosure.
Figure 4B:
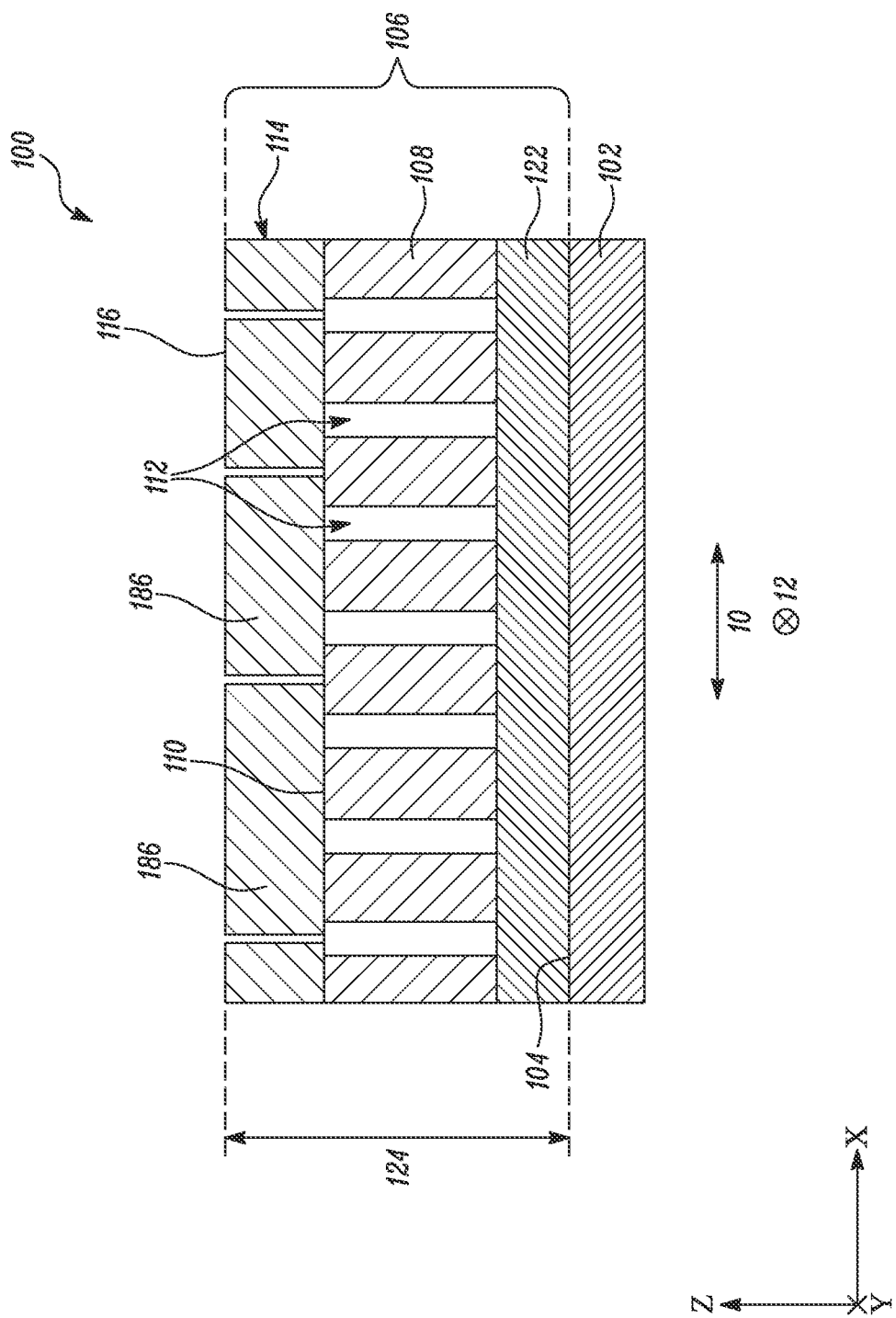
Figure 4C:
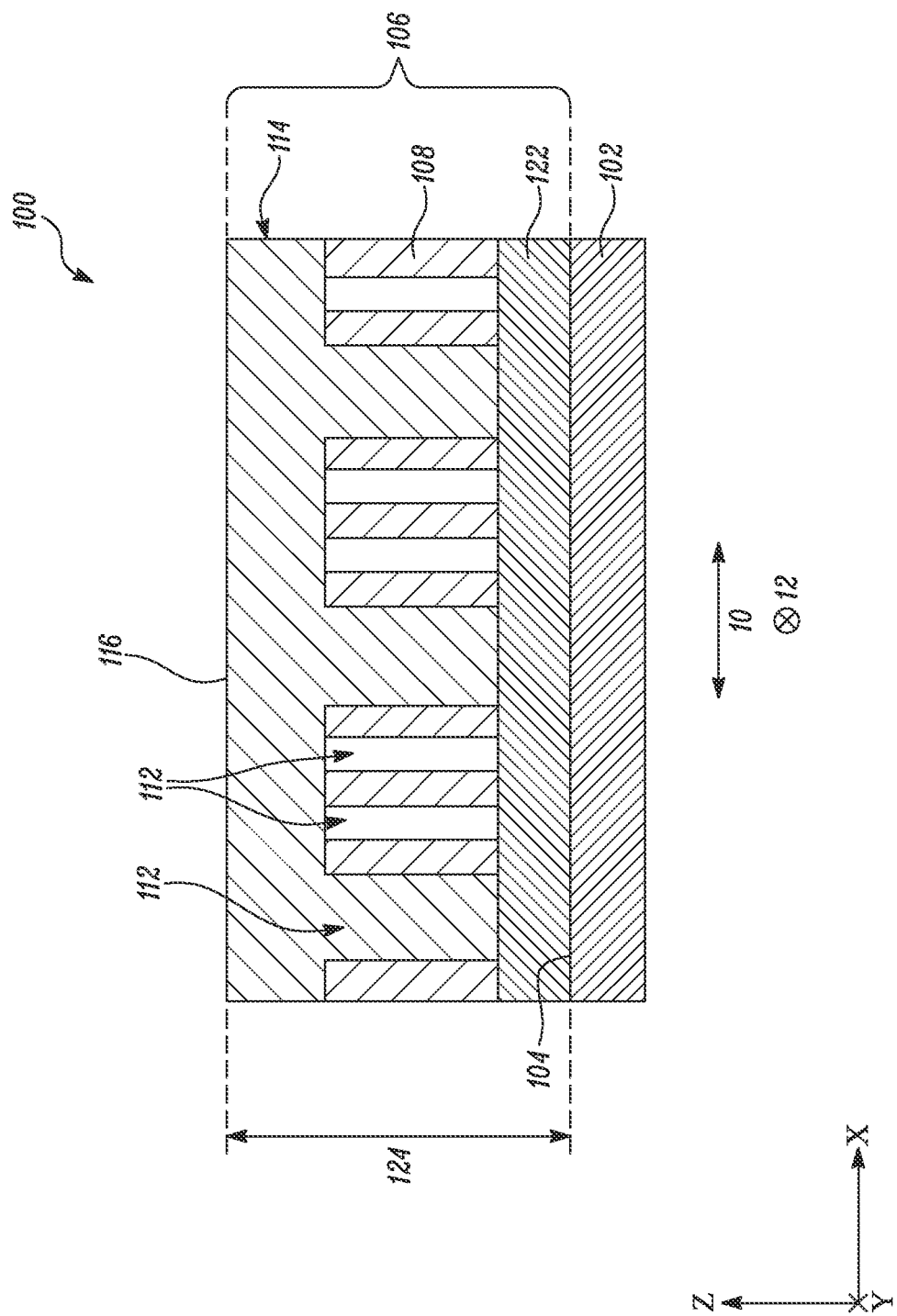

FIGS. 4A-4C illustrate schematic sectional side views of the coated article 100, according to different embodiments of the present disclosure. In the illustrated embodiments of FIGS. 4A-4C, the plurality of cracks 118 are not shown for clarity.

Referring to FIG. 4A, in some embodiments, the glazed layer 114 includes a plurality of discrete sections 180. The top layer 108 includes a plurality of projecting sections 182. Each projecting section 182 from the plurality of projecting sections 182 is disposed between adjacent discrete sections 180 from the plurality of discrete sections 180.

In some embodiments, each projecting section 182 includes a non-glazed external surface 184 disposed adjacent to the glazed external surface 116. Thus, in the illustrated embodiment of FIG. 4A, the protective coating 106 has the total thickness 124 from the glazed external surface 116 and/or the non-glazed external surface 184 to the major surface 104 of the substrate 102.

In the illustrated embodiment of FIG. 4A, the plurality of discrete sections 180 and the plurality of projecting sections 182 are disposed along the longitudinal axis 10. However, the plurality of discrete sections 180 and the plurality of projecting sections 182 may also be disposed along the transverse axis 12, in addition to the longitudinal axis 10 or otherwise. The protective coating 106 as shown in FIG. 4A may allow increase in resistance to hot gas penetration (or calcium-magnesium-alumino-silicates propagation) to the substrate 102.

Referring to FIG. 4B, in some embodiments, the glazed layer 114 incudes a plurality of discrete patches 186, such that the plurality of discrete patches 186 are spaced apart from each other. In some embodiments, the plurality of discrete patches 186 have a hexagonal shape (along the X-Y plane of the coated article 100). The hexagonal shape may allow close packing of the plurality of discrete patches 186 while being spaced apart from each other. In the illustrated embodiment of FIG. 4B, the plurality of discrete patches 186 are disposed along the longitudinal axis 10. However, the plurality of discrete patches 186 may also be disposed along the transverse axis 12, in addition to the longitudinal axis 10 or otherwise.

Referring to FIG. 4C, in some embodiments, the glazed layer 114 at least partially fills one or more slots 112 from the plurality of slots 112. In other words, a material of the glazed layer 114 at least partially fills the one or more slots 112 from the plurality of slots 112 of the top layer 108. In the illustrated embodiment of FIG. 4C, the glazed layer 114 at least partially fills the one or more slots 112 that are disposed along the longitudinal axis 10. However, the glazed layer 114 may also at least partially fill the one or more slots 112 described with reference to FIGS. 2B-2D.

The protective coating 100 described with reference to FIGS. 4A-4C may allow reduction in a stiffness (or thermomechanical compliance) of the glazed layer 114 along the longitudinal axis 10 or the transverse axis 12, and/or may allow reduction in a ratio of a horizontal stiffness of the glazed layer 114 (along the longitudinal axis 10 or the transverse axis 12) to a vertical stiffness (along the Z-axis) of the glazed layer 114.

In some embodiments, the highest thermomechanical compliance may be observed in the glazed layer 114 described with reference to FIG. 4B as the plurality of discrete patches 186 are completely spaced apart from each other. This is followed by thermomechanical compliance of the glazed layer 114 described with reference to FIG. 4A as the material of the top layer 108 (which may typically be produced through spray deposition) may be more compliant than a material of the glazed layer 114, which is typically denser than the top layer 108. The least thermomechanical compliance may be observed in the glazed layer 114 described with reference to FIG. 4C in which the material of the glazed layer 114 is continuous and fills the one or more slots 112 from the plurality of slots 112.

In the disclosure, embodiments are described hereinafter in detail for a method of forming a protective coating (e.g., the protective coating 106). A skilled person will appreciate that the methods and processes described hereinafter are not limited to this use and application only, and those methods and processes are described by way of an example for forming the protective coating using the described methods and processes.

Figure 5:
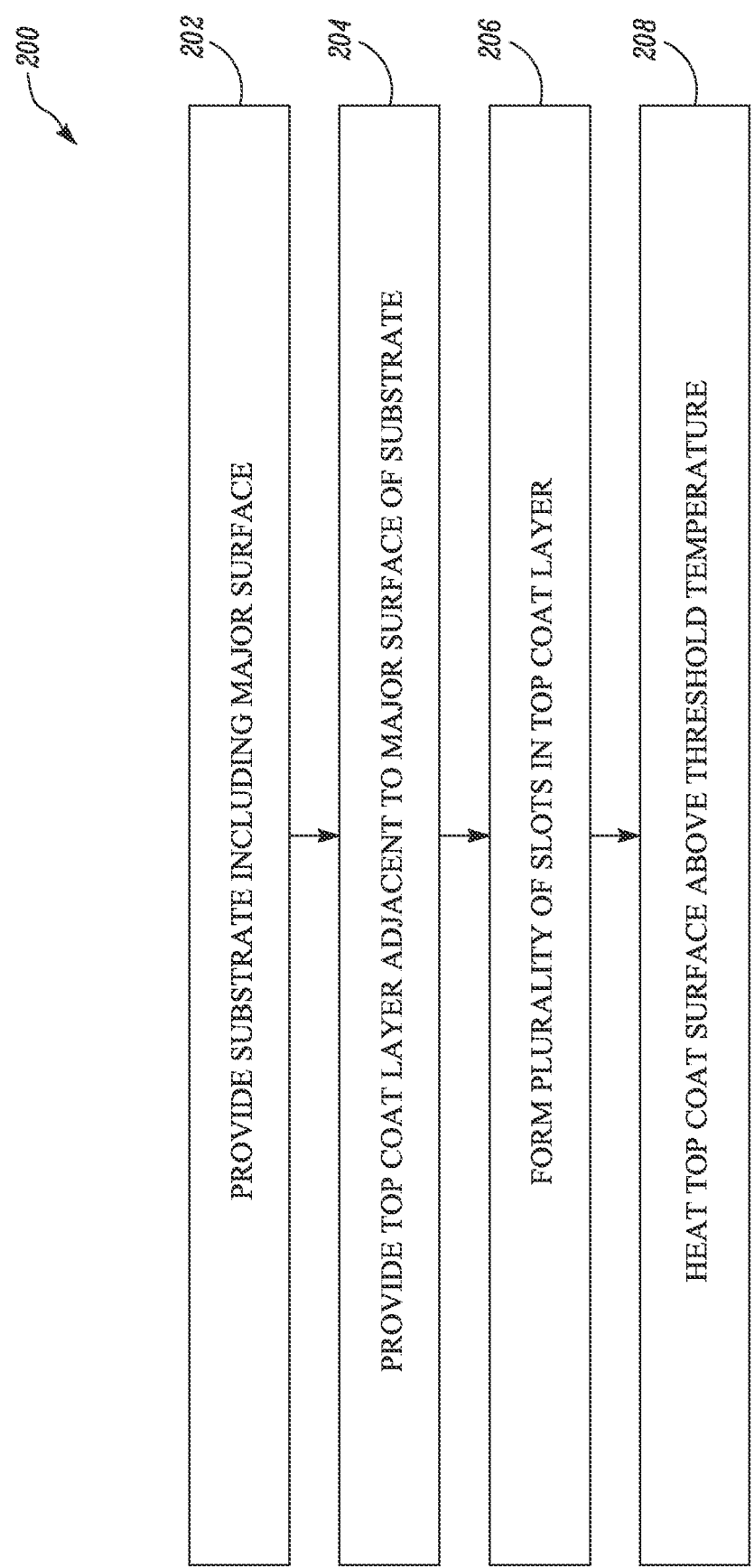
FIG. 5 is a flowchart illustrating a method of forming a protective coating, according to an embodiment of the present disclosure.

FIG. 5 is a flow chart illustrating a method 200 of forming a protective coating. In some embodiments, the protective coating may be similar to the protective coating 106 (shown in FIG. 1). The method 200 will be described hereinafter with reference to the coated article 100 of FIGS. 1-4C and FIGS. 6A-16.

Figure 6B:
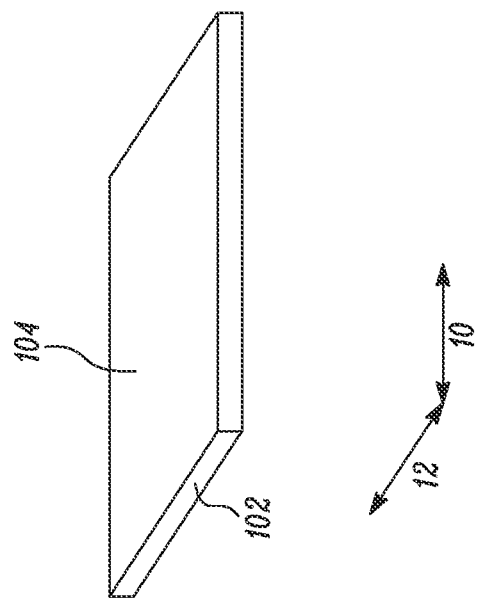
FIG. 6B is a schematic perspective view of the substrate of FIG. 5A, according to an embodiment of the present disclosure.
Figure 6A:
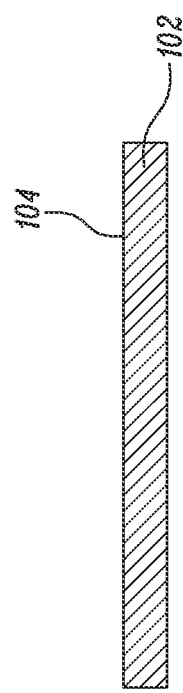
FIG. 6A is a schematic sectional side view of a substrate, according to an embodiment of the present disclosure.

FIGS. 6A-6B illustrate schematic views of the substrate 102. Specifically, FIG. 6A illustrates a schematic sectional side view of the substrate 102 and FIG. 6B illustrates a schematic perspective view of the substrate 102. Referring now to FIGS. 5 and 6A-6B, at step 202, the method 200 includes providing the substrate 102 including the major surface 104. In some embodiments, the substrate 102 (e.g., a component of a gas turbine engine) may be a high-temperature material, such as a superalloy. However, the substrate 102 may include any material based on application requirements. In some examples, the substrate 102 may include silicon carbide-silicon carbide (SiC—SiC) matrix composites. In some embodiments, the major surface 104 defines the longitudinal axis 10 along the length of the substrate 102 and the transverse axis 12 perpendicular to the longitudinal axis 10. It should be understood that the substrate 102 is schematically shown in FIGS. 6A-6B for illustrative purposes.

Suitable alloys for the substrate 102 may include, but are not limited to, nickel-based superalloys, cobalt-based superalloys, iron-based superalloys, low sulphur nickel-based superalloys, low sulphur cobalt-based superalloys, low sulphur iron-based superalloys, etc. Such superalloys may typically include a polycrystalline structure, but may have portions with a single-crystal or directionally solidified crystalline structure. In some embodiments, the substrate 102 may include nickel-based superalloys commercially available under the trademark Inconel®.

Figure 7:
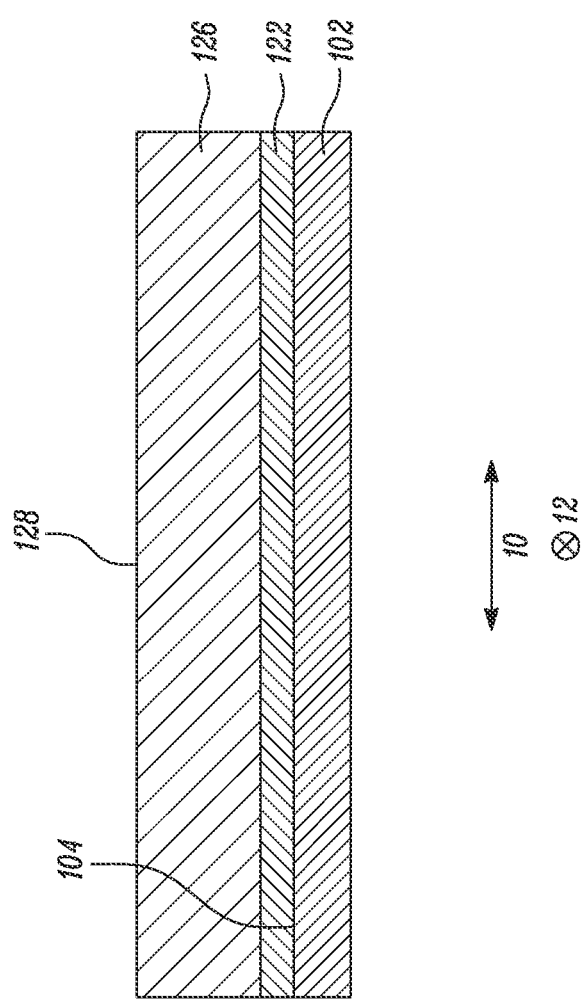
FIG. 7 is a schematic sectional view of a top coat layer, a bond coat layer, and the substrate, according to an embodiment of the present disclosure.

FIG. 7 illustrates a schematic sectional view of the substrate 102, the bond coat layer 122, and a top coat layer 126. In some embodiments, the top coat layer 126 may include the same material as that of the top layer 108 (shown in FIGS. 1-4C). Referring now to FIGS. 5 and 7, at step 204, the method 200 further includes providing the top coat layer 126 adjacent to the major surface 104 of the substrate 102. The top coat layer 126 includes a top coat surface 128 distal to the substrate 102.

In some embodiments, the top coat layer 126 may be further processed (e.g., heated) for forming the protective coating 106 (shown in FIG. 1). The method 200 further includes providing the bond coat layer 122 between the top coat layer 126 and the major surface 104 of the substrate 102 prior to at least partially heating the top coat surface 128. The bond coat layer 122 may improve adhesion of the top coat layer 126 to the major surface 104 of the substrate 102 and may also reduce a rate of oxidation of the substrate 102.

Figure 8:
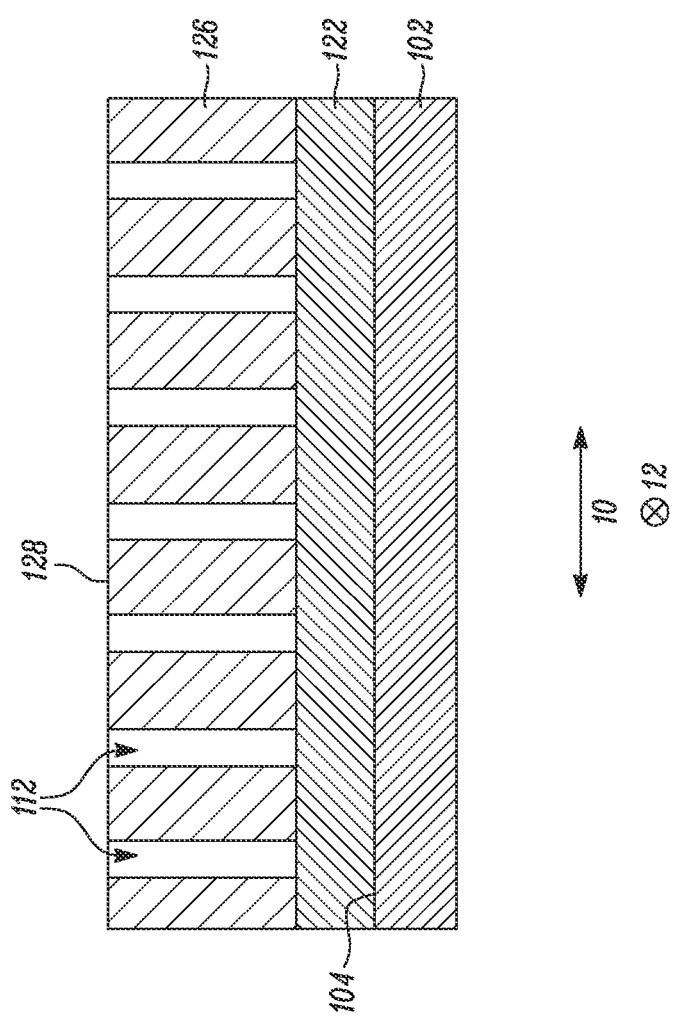
FIG. 8 is a schematic sectional view of the top coat layer, the bond coat layer, and the substrate, where a plurality of slots is formed in the top coat layer, according to an embodiment of the present disclosure.

FIG. 8 illustrates a schematic sectional view of the substrate 102, the bond coat layer 122, and the top coat layer 126. Referring now to FIGS. 5 and 8, at step 206, the method 200 further includes forming the plurality of slots 112 in the top coat layer 126. Each slot 112 from the plurality of slots 112 extends at least partially from the top coat surface 128 towards the major surface 104 of the substrate 102 prior to at least partially heating the top coat surface 128. Specifically, each slot 112 from the plurality of slots 112 extends from the top coat surface 128 to the bond coat layer 122. In some other embodiments, at least one slot 112 from the plurality of slots 112 extends from the top coat surface 128 to the bond coat layer 122 prior to at least partially heating the top coat surface 128.

In some embodiments, at least one slot 112 (e.g., the slot 170 shown in FIG. 2A) from the plurality of slots 112 at least partially extends parallel to the transverse axis 12 of the major surface 104. Alternatively, at least one slot 112 (e.g., the slot 172 shown in FIG. 2B) from the plurality of slots 112 at least partially extends parallel to the longitudinal axis 10. Alternatively, at least one slot 112 (e.g., the slot 174 shown in FIG. 2C) from the plurality of slots 112 at least partially extends obliquely relative to the longitudinal axis 10.

In some embodiments, forming the plurality of slots 112 in the top coat layer 126 includes at least one of laser cutting, water jet machining, abrasive machining, photolithography, milling, or a combination thereof. For example, the slots 112 may be formed by cutting using a high-speed saw, a laser system, a high-speed water jet, a high-speed jet of fluid comprising abrasives, or combinations thereof. In some embodiments, the plurality of slots 100 may traverse one or more layers of the top coat layer 126.

Formation of the plurality of slots 112 in the top coat layer 126 may reduce thermal stress accumulation within the final protective coating 106 (shown in FIG. 1) and may provide a material of the top coat layer 126 with a free space to expand, thereby improving strain tolerance (or thermomechanical compliance) of the final protective coating 106 (shown in FIG. 1). This strain tolerance may be vital for components such as high-pressure turbine blades. In terms of thermal stress relaxation, it may be beneficial to create a through gap in the top coat layer 126 without affecting the bond coat layer 122 (when present).

Figure 9:
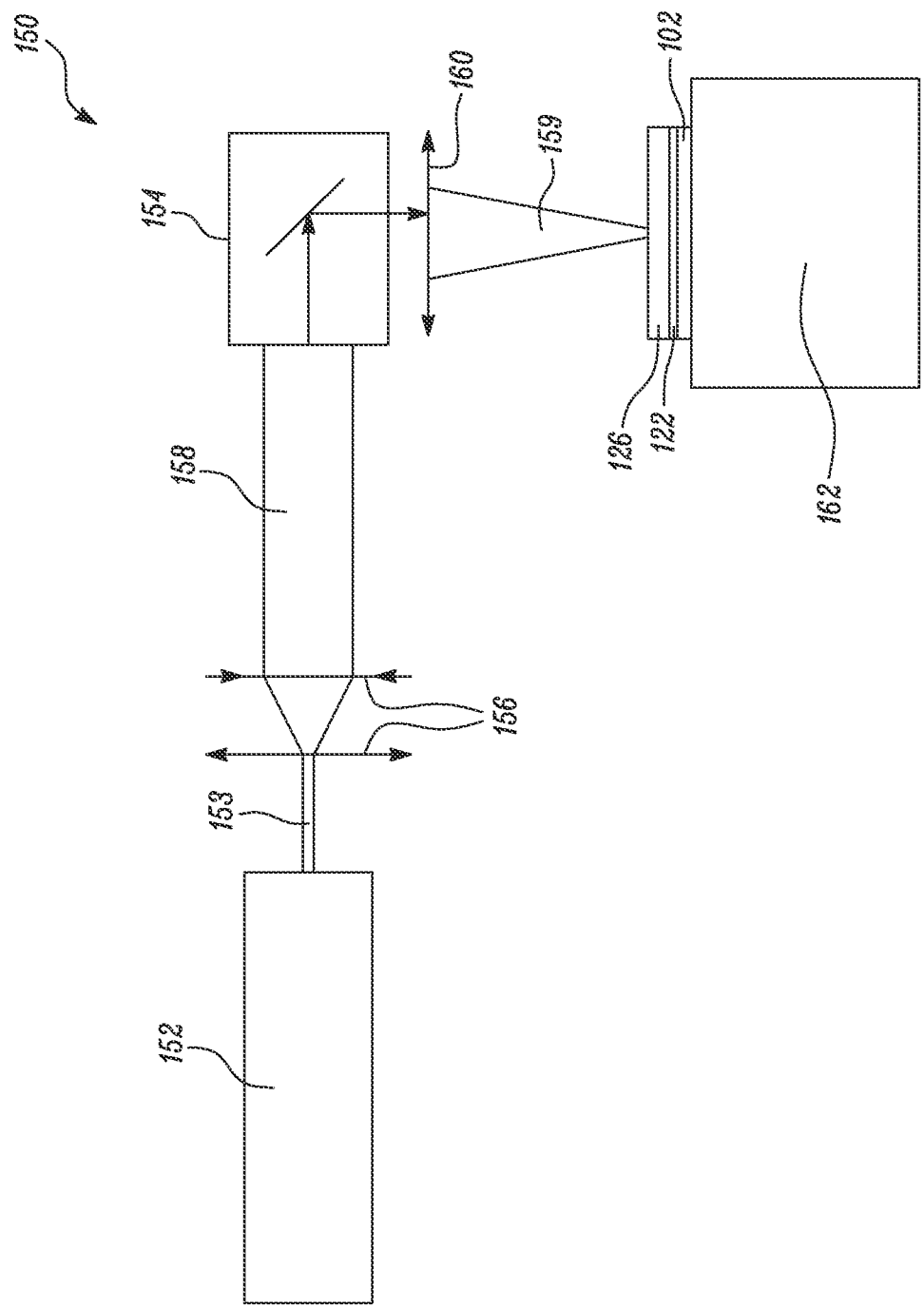
FIG. 9 is a schematic view of a laser ablation apparatus, according to an embodiment of the present disclosure.

FIG. 9 illustrates a schematic view of a laser ablation apparatus 150. In some embodiments, the laser ablation apparatus 150 may be used for forming the plurality of slots 112 (shown in FIG. 8) in the top coat layer 126 though laser ablation or laser cutting.

In general, the top coat layer 126 may have a varying thickness. Further, the top coat layer 126 is anisotropic with randomly distributed pores and interfaces. Consequently, laser ablation of the top coat layer 126 may generate slots 112 that are deeper or narrower than a required depth. Thus, when forming the plurality of slots 112 in the top coat layer 126, an appropriate laser ablation regime may be chosen.

In some embodiments, the laser cutting includes using an ultrashort pulse laser. In some examples, the ultrashort pulse laser may be a picosecond laser or a femtosecond laser. The picosecond laser may prevent damage to the substrate 102 if a material of the top coat layer 126 has sufficiently low thermal conductivity. In a picosecond ablation regime, an ablation rate of the underlying bond coat layer 122 is negligible in comparison to the top coat layer 126. In other words, it may be safe to use lasers with a pulse duration equal to or shorter than tens of picoseconds. However, in some other embodiments, lasers with a pulse duration of femtosecond or shorter may also be utilized that may ensure correct metallurgical properties of the final protective coating 106 (shown in FIG. 1). In some embodiments, an energy density of the ultrashort pulse laser is less than or equal to about 2 J/mm$^2$. This may induce least amount of thermal damage to the bond coat layer 122 during laser cutting.

In the illustrated embodiment of FIG. 9, the laser ablation apparatus 150 includes a pulsed laser source 152 that generates a laser beam 153. In some embodiments, the laser beam 153 includes the picosecond laser. The laser beam 153 passes through one or more beam expanders 156 that generates an expanded laser beam 158. The expanded laser beam 158 then falls on a galvanometer optical scanner 154 that reflects the expanded laser beam 158 towards a focusing lens 160. The expanded laser beam 158 further passes through the focusing lens 160 and forms a focused laser beam 159 that is utilized for forming the plurality of slots 112 on the top coat layer 126 mounted on a stage 162.

In some embodiments, the stage 162 may be able to move along its respective x, y and z axes to generate a pattern or an array of slots 112 (shown in FIG. 8) in the top coat layer 126. Thus, the top coat layer 126 may be manipulated by means of the stage 162 to generate different patterns of slots 112 (shown in FIG. 8) in the top coat layer 126. In some embodiments, the focused laser beam 159 may have a pulse energy of 0.3 millijoules (mJ), a spot size of 35 μm, a scanning speed of 25 millimetres per second (mm/s), and a pulse repetition rate of 4 kilohertz (kHz).

In some embodiments, the plurality of slots 112 may be formed using a fixed laser architecture. In some embodiments, the laser ablation apparatus 150 may include passive beam shaping means for shaping the focused laser beam 159, such as a diffractive optical element, a masking, and an aspherical lens. Specific diffractive optical elements may be used based on application requirements. Alternatively, in some embodiments, the laser ablation apparatus 150 may include active beam shaping means, such as a digital micromirror device (DMD), a liquid crystal spatial light modulator, a deformable mirror spatial light modulator, and an acoustic gradient lens.

Figure 10:
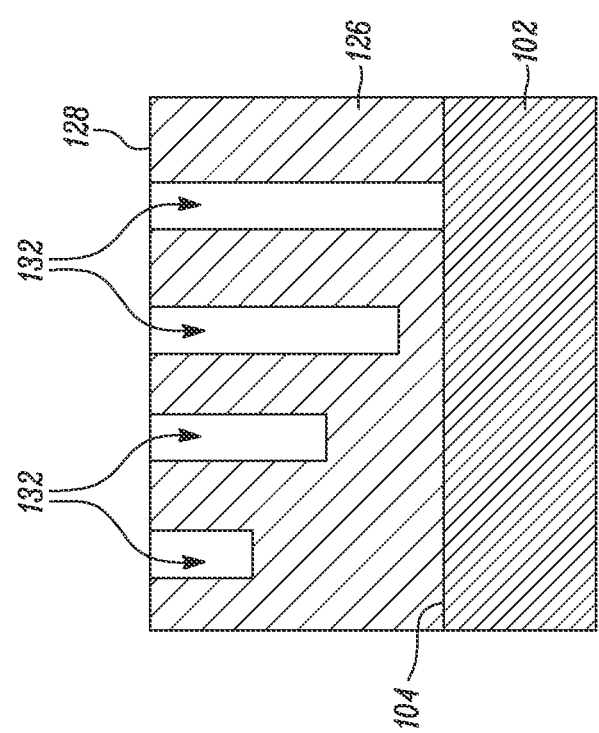
FIG. 10 is a schematic sectional side view of the top coat layer and the substrate, according to an embodiment of the present disclosure.

FIG. 10 illustrates an enlarged schematic sectional view of the substrate 102 and the top coat layer 126. The top coat layer 126 includes a plurality of slots 132. The plurality of slots 132 may be similar to the plurality of slots 112 (shown in FIG. 8). In the illustrated embodiment of FIG. 10, the bond coat layer 122 is not shown. However, the bond coat layer 122 may be disposed between the top coat layer 126 and the major surface 104 of the substrate 102. Referring now to FIGS. 5 and 10, at step 206, the method 200 further includes forming the plurality of slots 132 in the top coat layer 126. In some embodiments, the plurality of slots 132 may be formed using the laser ablation apparatus 150 (shown in FIG. 9).

In the illustrated embodiment of FIG. 10, at least one slot 132 from the plurality of slots 132 extends from the top coat surface 128 to the major surface 104 of the substrate 102 prior to at least partially heating the top coat surface 128. Further, some slots 132 from the plurality of slots 132 do not extend to the major surface 104 of the substrate 102. In other words, some slots 132 from the plurality of slots 132 may not extend fully through a thickness of the top coat layer 126. For example, some slots 132 from the plurality of slots 132 may extend through about 20% to about 90% of a thickness of the top coat layer 126. In some embodiments, the plurality of slots 132 are formed in a cascading pattern.

Figure 11A:
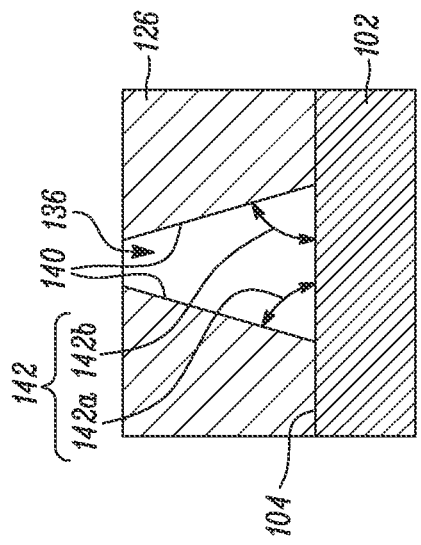
FIGS. 11A-11D are schematic sectional side views of the top coat layer and the substrate, according to different embodiments of the present disclosure.
Figure 11B:
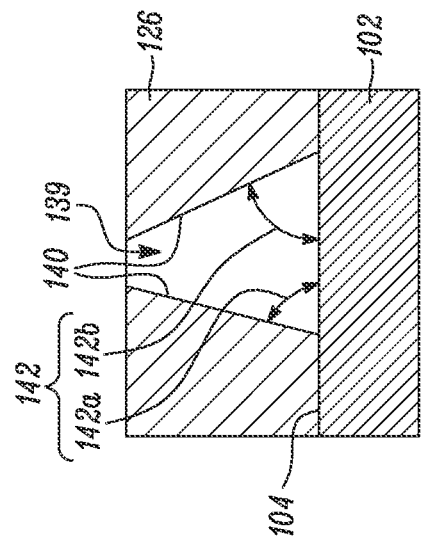
Figure 11C:
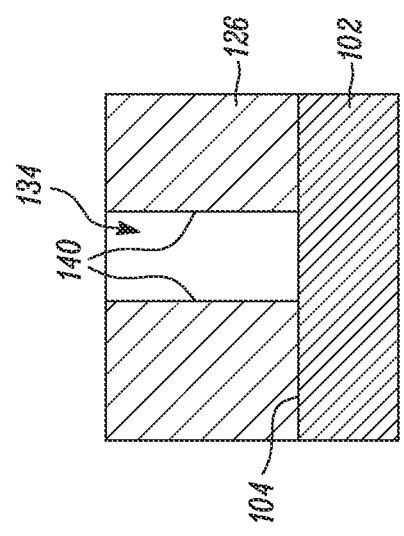
Figure 11D:
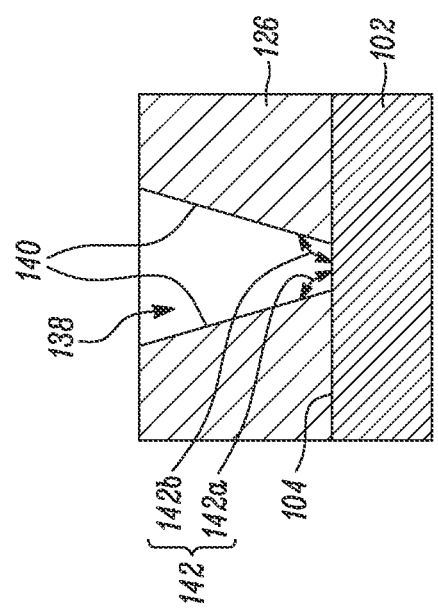

FIGS. 11A-11D illustrate schematic sectional views of the substrate 102 and the top coat layer 126, according to different embodiments of the present disclosure. Specifically, FIG. 11A illustrates a schematic sectional view of the substrate 102 and the top coat layer 126 including a plurality of slots 134; FIG. 11B illustrates a schematic sectional view of the substrate 102 and the top coat layer 126 including a plurality of slots 136; FIG. 11C illustrates a schematic sectional view of the substrate 102 and the top coat layer 126 including a plurality of slots 138; and FIG. 11D illustrates a schematic sectional view of the substrate 102 and the top coat layer 126 including a plurality of slots 139.

In the illustrated embodiments of FIGS. 11A-11D, the bond coat layer 122 is not shown. In some embodiments, the slots 134, 136, 138, 139 may be similar to the slots 112, 132 shown in FIGS. 1 and 10, respectively. Further, each slot 134, 136, 138, 139 from the plurality of slots 134, 136, 138, 139 is at least partially defined by a pair of opposing walls 140 of the top coat layer 126. In some embodiments, the laser ablation apparatus 150 (shown in FIG. 9) may be used for forming the plurality of slots 134, 136, 138, 139 (shown in FIGS. 11A-11D) in the top coat layer 126.

In the illustrated embodiment of FIG. 11A, the slot 134 has a rectangular cross-sectional area. Further, each wall 140 from the pair of walls 140 is perpendicular to the major surface 104 of the substrate 102.

In the illustrated embodiment of FIG. 11B, at least one wall 140 from the pair of walls 140 is inclined obliquely to the major surface 104 of the substrate 102 by an inclination angle 142. In some embodiments, each of the pair of walls 140 is inclined obliquely to the major surface 104 of the substrate 102 by a corresponding inclination angle 142a, 142b. In some other embodiments, the corresponding inclination angles 142a, 142b may be equal to each other. In some embodiments, the inclination angle 142 is less than 90 degrees or greater than 90 degrees. In the illustrated embodiment of FIG. 11B, the inclination angles 142a, 142b are less than 90 degrees. Specifically, the slot 136 has a trapezoidal cross-sectional area having a larger base towards the major surface 104 of the substrate 102.

In the illustrated embodiment of FIG. 11C, each wall 140 from the pair of walls 140 is inclined obliquely to the major surface 104 of the substrate 102 by the inclination angles 142a, 142b. The inclination angles 142a, 142b are greater than 90 degrees. Specifically, the slot 138 has a trapezoidal cross-sectional area having a smaller base towards the major surface 104 of the substrate 102.

In the illustrated embodiment of FIG. 11D, the corresponding inclination angles 142a, 142b are different from each other. In some other embodiments, one of the walls 140 from the pair of walls 140 may be perpendicular to the major surface 104 of the substrate 102 while the other wall 140 from the pair of walls 140 may be inclined obliquely to the major surface 104 of the substrate 102 by the inclination angle 142 that is less than or greater than 90 degrees.

In some embodiments, appropriate geometry and shape of the plurality of slots 134, 136, 138, 139 may be tailored based on application requirements, component requirements, and thermomechanical behaviour that the component may witness during operating conditions. For instance, coated regions of an aerofoil of a high-pressure turbine blade which require higher strain compliance (due to a higher surface temperature during operating conditions) may be produced with a larger number of slots 134, 136, 138, 139 in the top coat layer 126. Moreover, the plurality of slots 134, 136, 138, 139 may be manufactured in a variety of arrays or structures to match a 3D strain compliance requirements of the component.

Some examples of the arrays and structures may include criss-cross shapes (i.e., overlapping slots), but may also include production of columns in a bespoke array (i.e., isolated "drilled" holes into the top coat layer 126). In some embodiments, the inclination angles 142a, 142b may be controlled based on specific stress gradient directions within the final protective coating 106 (shown in FIG. 1). For example, a stress distribution may be controlled via change in the inclination angles 142a, 142b. This may be produced on specific regions of a component to match the strain compliance requirements. Further, the inclination angles 142a, 142b and the arrays/patterns of slots 112 may be generated via a computer model of the component.

It should be understood that the example embodiments described above with reference to FIGS. 11A-11D are equally applicable to the slots 112, 132 (shown in FIGS. 1-4C, 8 and 10).

Figure 12:
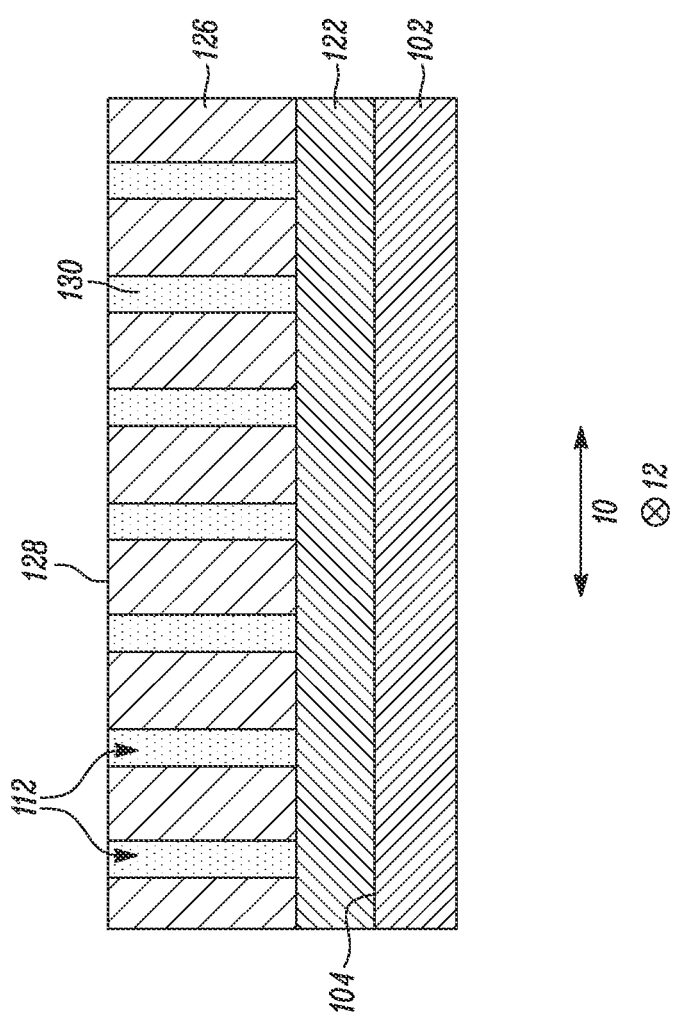
FIG. 12 is a schematic sectional side view of the top coat layer, the bond coat layer, and the substrate, where the slots are filled with a filling material, according to an embodiment of the present disclosure.

FIG. 12 illustrates a schematic sectional view of the substrate 102, the bond coat layer 122, and the top coat layer 126. Referring now to FIGS. 5 and 12, the method 200 further includes filling at least one slot 112 from the plurality of slots 112 with a filling material 130 prior to at least partially heating the top coat surface 128. Thus, the at least one slot 112 from the plurality of slots 112 may be formed with an increased slot width since the at least one slot 112 may be filled with the filling material 130 later. Thus, the thermomechanical compliance of the protective coating 106 (shown in FIG. 1) may be improved with the increased slot width. Further, this may enhance calcium-magnesium-alumino-silicate (CMAS) resistance of the protective coating 106 (shown in FIG. 1) due to reduction of hollow spaces, i.e., the slots 112 being filled with the filling material 130. Additionally, this may reduce thermal stresses (due to thermally grown oxides) accumulated at the interface between the bond coat layer 122 and the top coat layer 126 due to the plurality of slots 112 being filled with the filling material 130.

In some embodiments, the filling material 130 is further filled in the at least one slot 112 from the plurality of slots 112 at least partially parallel to the transverse axis 12 of the major surface 104. In some embodiments, the filling material 130 may also be filled in the at least one slot 132, 134, 136, 138, 139 from the plurality of slots 132, 134, 136, 138, 139 (shown in FIGS. 10 and 11A-11D) of the top coat layer 126.

Examples of the filling material 130 may include zirconium dioxide ($ZrO_2$) stabilised with yttrium oxide ($Y_2O_3$), cerium (IV) oxide ($CeO_2$), magnesium oxide (MgO), or calcium oxide (CaO). Other examples of the filling material 130 may include $Gd_2Zr_2O_7$, $La_2Zr_2O_7$, $LaMgAl_{11}O_{19}$, $SrZrO_3$, titanium dioxide ($TiO_2$), scandium oxide ($Sc_2O_3$), and aluminium oxide ($Al_2O_3$). In some embodiments, the filling material 130 may be a secondary material in the form of a powder, a colloid suspension, or a solution of the aforementioned materials.

Figure 13:
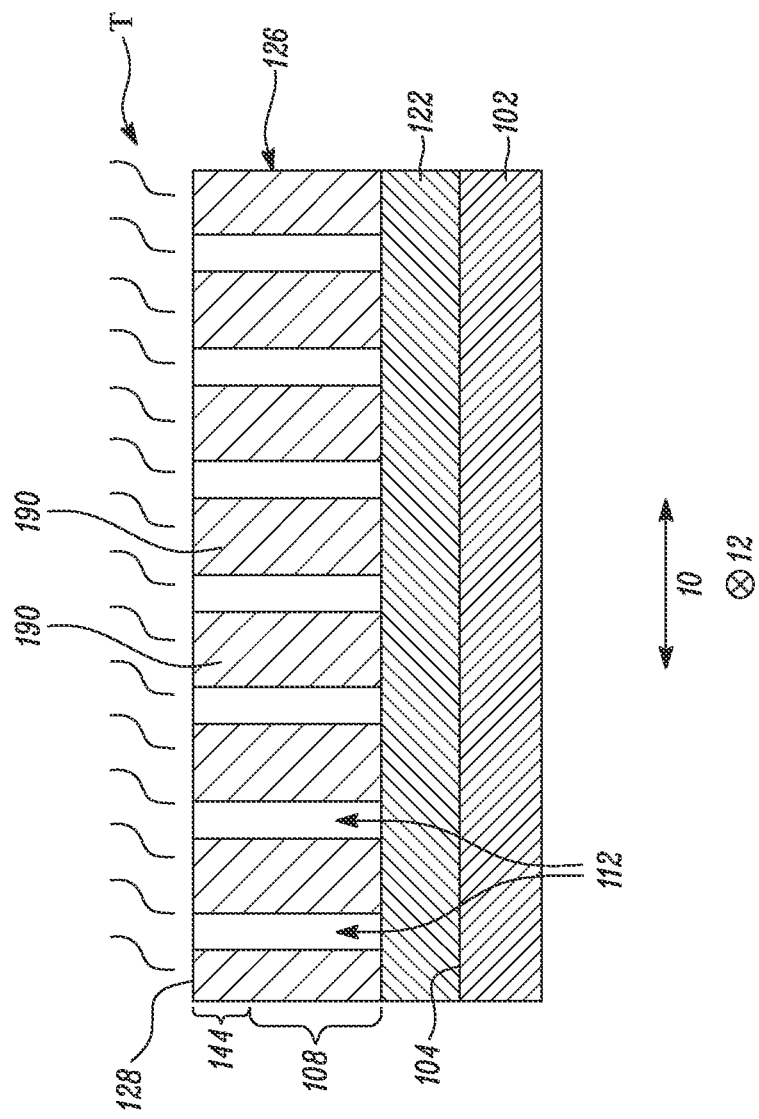
FIG. 13 is a schematic sectional side view of the top coat layer, the bond coat layer, and the substrate, where a top coat surface of the top coat layer is at least partially heated above a threshold temperature, according to another embodiment of the present disclosure.

FIG. 13 illustrates a schematic sectional view of the substrate 102, the bond coat layer 122, and the top coat layer 126. Referring now to FIGS. 5 and 13, at step 208, the method 200 further includes at least partially heating the top coat surface 128 above a threshold temperature T, such that a first portion 144 of the top coat layer 126 extending from the top coat surface 128 at least partially melts. Further, at step 208, the method 200 further includes at least partially heating the top coat surface 128 above the threshold temperature T, such that a second portion 108 of the top coat layer 126 is not melted and includes at least a portion of each of the plurality of slots 112. The second portion 108 corresponds to the top layer 108 (shown in FIG. 1), and hence, the same reference numeral 108 is used to refer to both.

In some embodiments, the threshold temperature T may correspond to a melting temperature of a material of the top coat layer 126. In some embodiments, the top coat surface 128 may be at least partially heated using energy sources, such as a combustion torch or a plasma torch. In some embodiments, at least partially heating the top coat surface 128 further includes heating using a laser. In some embodiments, an energy density of the laser is less than or equal to about 5 J/mm$^2$. In some embodiments, the laser is a pulsed laser having a pulse duration of at least 1 nanosecond or a continuous wave laser.

In some embodiments, the laser ablation apparatus 150 (shown in FIG. 9) may also be used for at least partially heating the top coat surface 128 of the top coat layer 126. In such cases, a spot size of a laser beam may be 400 µm and a scanning speed may be 50 mm/s. In some embodiments, the top coat surface 128 may be at least partially heated to form an array of tracks extending along the longitudinal axis 10 of the major surface 104 of the substrate 102. In some embodiments, a distance between the tracks along the transverse axis 12 may be about 320 µm.

Figure 14:
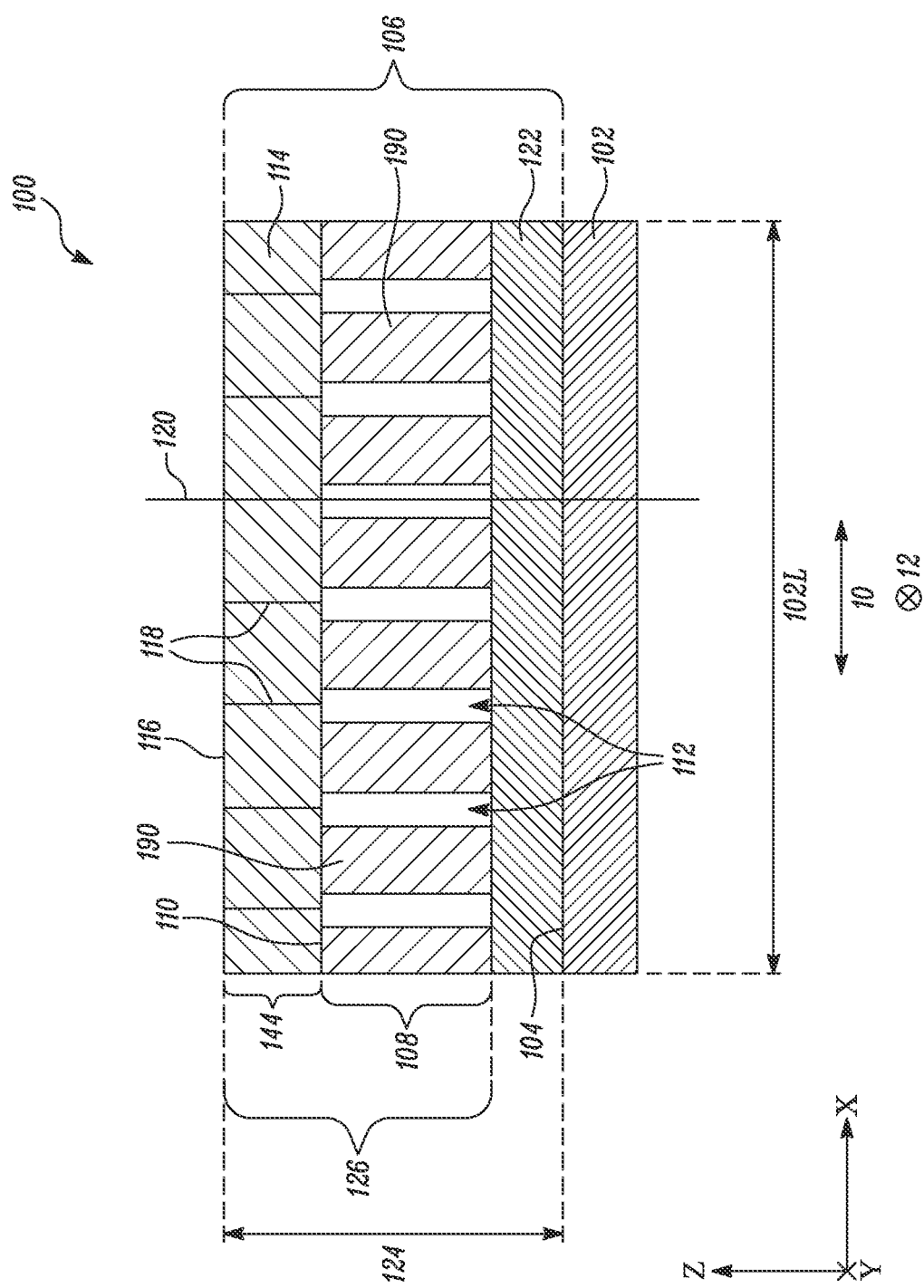
FIG. 14 is a schematic sectional side view of the coated article, according to another embodiment of the present disclosure.

FIG. 14 illustrates a schematic sectional view of the coated article 100 according to another embodiment of the present disclosure. Referring to FIGS. 13 and 14, upon at least partially heating the top coat surface 128 above the threshold temperature T, the first portion 144 of the top coat layer 126 at least partially melts to form the glazed layer 114. Further, the second portion 108 of the top coat layer 126 is disposed between the glazed layer 114 and the major surface 104 of the substrate 102. The second portion 108 is also interchangeably referred to herein as the top layer 108 (shown in FIG. 1). The second portion 108 includes at least a portion of each of the plurality of slots 112. In some embodiments, the second portion 108 may include at least a portion of each of the plurality of slots 132, 134, 136, 138, 139 (shown in FIGS. 10 and 11A-11D).

In some embodiments, a density of the glazed layer 114 is greater than a density of the second portion 108 of the top coat layer 126. The glazed layer 114 includes the glazed external surface 116 distal to the second portion 108 of the top coat layer 126. The glazed layer 116 and the second portion 108 of the top coat layer 126 together form the protective coating 106 having the total thickness 124 from the glazed external surface 116 to the major surface 104 of the substrate 102. In some embodiments, the coated article 100 further includes the bond coat layer 122. In such cases, the glazed layer 116, the second portion 108 of the top coat layer 126, and the bond coat layer 122 together form the protective coating 106.

In some embodiments, a thickness of the glazed layer 114 may be controlled based on laser beam parameters in order to optimize the protective coating 106 based on application requirements. Choice of energy and power density of the laser beam, as well as a scanning speed of the laser beam may be determined based on geometrical parameters of the slots 112. An amount of heating may be decreased with increased scanning speed, decreased laser power, increased laser beam diameter and/or decreasing power density of the laser beam.

In some embodiments, the glazed layer 114 includes the plurality of cracks 118 disposed within the glazed layer 114. Further, as discussed above, each crack 118 from the plurality of cracks 118 is at least partially aligned with the corresponding slot 112 from the plurality of slots 112 in the plane 120 normal to the major surface 104 of the substrate 102.

In some embodiments, the plurality of cracks 118 may be an inevitable result of at least partially heating the top coat surface 128 of the top coat layer 126 (comprising zirconia) above the threshold temperature T. The plurality of cracks 118 may be generated due to a high coefficient of thermal expansion and a high melting point of the material of the top coat layer 126, thus generating high tensile thermal stresses during cooling. The cooling is rapid, and the melted material of the top coat layer 126 disposed between the plurality of slots 112 solidifies rapidly as compared to the melted material of the top coat layer 126 above the slots 112.

When the melted material of the top coat layer 126 solidifies, heat flow is directed into columns 190 of the second portion 108 of the top coat layer 126. Thermoelastic strain is minimal at a surface of solidification and amplifies with propagation away from the surface of solidification. Therefore, the plurality of cracks 118 may be generated in the glazed layer 114 and each crack 118 from the plurality of cracks 118 is at least partially aligned with the corresponding slot 112 as the accumulated thermoelastic strain between the columns 190 is higher.

Referring now to FIGS. 4A and 13, the top coat surface 128 is at least partially heated, such that the first portion 144 of the top coat layer 126 includes the plurality of discrete sections 180 and the second portion 108 (or the top layer 108 shown in FIG. 4A) of the top coat layer 126 includes the plurality of projecting sections 182. Each projecting section 182 from the plurality of projecting sections 182 is disposed between adjacent discrete sections 180 from the plurality of discrete sections 180. Each projecting section 182 includes the non-glazed external surface 184 disposed adjacent to the glazed external surface 116.

In other words, the top coat surface 128 may be at least partially heated above the threshold temperature T, such that the first portion 144 of the top coat layer 126 at least partially melts (e.g., along the longitudinal axis 10) to form the plurality of discrete sections 180 in the glazed layer 114. Further, the first portion 144 of the top coat layer 126 may be at least partially or discontinuously heated to form the plurality of discrete sections 180. Moreover, each projecting section 182 of the top coat layer 126 is left non-glazed between the adjacent discrete sections 180 from the plurality of discrete sections 180 with the non-glazed external surface 184 of each projecting section 182 disposed adjacent to the glazed external surface 116.

In some embodiments, appropriate heating parameters (e.g., of the laser ablation apparatus 150 shown in FIG. 9) may be chosen for generating the plurality of discrete sections 180. In some embodiments, the plurality of discrete sections 180 may also be obtained through discontinuous heating by controlling a slot geometry, i.e., by controlling a width of the slots 112, or an opening of the slots 112.

Figure 15:
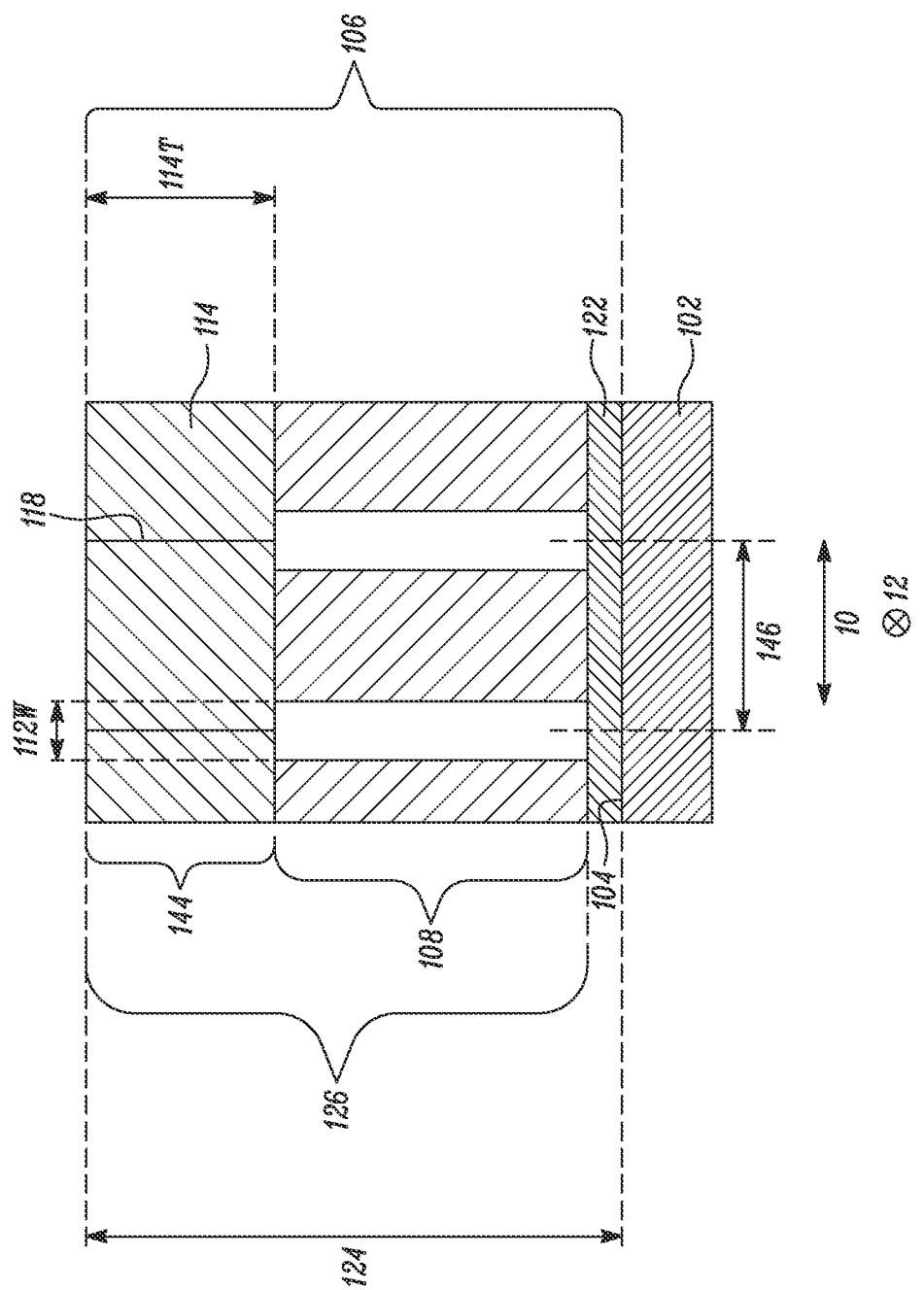
FIG. 15 is an enlarged sectional side view of a portion of the coated article of FIG. 13, according to an embodiment of the present disclosure.

FIG. 15 illustrates an enlarged schematic sectional view of a portion of the coated article 100. Referring to FIGS. 14 and 15, a width 112W of at least one slot 112 from the plurality of slots 112 is greater than or equal to about 1 µm. However, in some other embodiments, the width 112W of at least one slot 112 from the plurality of slots 112 may be greater than or equal to about 5 µm, greater than or equal to about 10 µm, greater than or equal to about 15 µm, greater than or equal to about 20 µm, or greater than or equal to about 25 µm. In some embodiments, the width 112W of the at least one slot 112 from the plurality of slots 112 is less than the total thickness 124 of the protective coating 106. In some embodiments, the width 112W of the at least one slot 112 from the plurality of slots 112 may be obtained based on desired strain tolerance of the protective coating 106.

Further, a minimum distance 146 between adjacent slots 112 from the plurality of slots 112 is greater than or equal to 10 µm. In some embodiments, the minimum distance 146 between the adjacent slots 112 is less than or equal to 10 times the total thickness 124 of the protective coating 106. The minimum distance 146 between the adjacent slots 112 may be chosen based on distance between the cracks 118 in the glazed layer 114 in order to connect the induced cracks 118 with the plurality of slots 112. A higher density of slots 112 may be beneficial, allowing to control a density of the cracks 118 with smaller width of the cracks 118. In some embodiments, a distance between the adjacent slots 112 may also be non-uniform in order to make some portions of the protective coating 106 more strain tolerant.

In some embodiments, the thickness 114T of the glazed layer 114 from the glazed external surface 116 to the second portion 108 of the top coat layer 126 is greater than or equal to 1 µm. In some embodiments, the thickness 114T of the glazed layer 114 is less than or equal to 90% of the total thickness 124 of the protective coating 106. The protective coating 106 having a relatively thin glazed layer 114 above the plurality of slots 112 may be able to accommodate greater thermomechanical stresses. Therefore, the strain tolerance of the protective coating 106 may be increased. A relatively thicker glazed layer 114 may reduce thermal conductivity and elemental transportation (e.g., oxygen) into an underlying structure of the protective coating 106.

Figure 16:
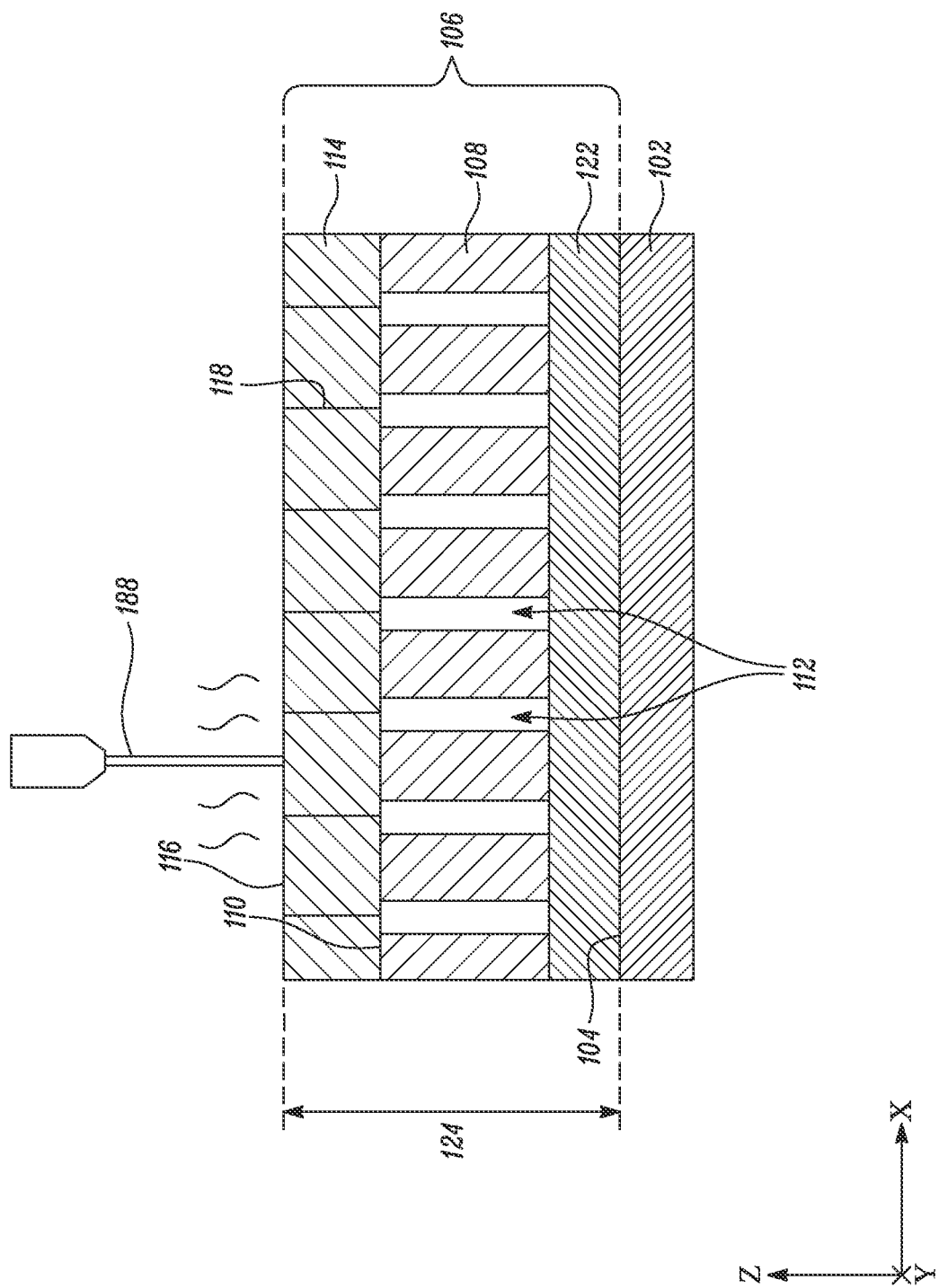
FIG. 16 is a schematic sectional side view of the substrate, the bond coat layer, the top layer and a glazed layer, according to an embodiment of the present disclosure.

FIG. 16 illustrates a schematic sectional view of the substrate 102, the bond coat layer 122, the top layer 108 and the glazed layer 114. Referring to FIGS. 4B, 5 and 16, the method 200 further includes cutting the glazed layer 114 to generate the plurality of discrete patches 186, such that the plurality of discrete patches 186 are spaced apart from each other. In some embodiments, the glazed layer 114 may be cut using a laser 188 (e.g., of the laser ablation apparatus 150 shown in FIG. 9). In some embodiments, the laser 188 may be used to cut only the glazed layer 114 and not the entire thickness 124 of the protective coating 106.

In some embodiments, the plurality of discrete patches 186 may be generated after at least partially heating the top coat surface 128 (shown in FIG. 13) to produce the glazed layer 114. In some embodiments, gaps between the plurality of discrete patches 186 may or may not align with the plurality of slots 112 or the plurality of slots 132, 134, 136, 138, 139 (shown in FIGS. 10 and 11A-11D).

Referring now to FIGS. 4C, 5 and 16, the method 200 further includes heating the glazed layer 114 such that the glazed layer 114 at least partially melts and fills one or more slots 112, 132, 134, 136, 138, 139 (shown in FIGS. 10, 11A-11D and 16) from the plurality of slots 112, 132, 134, 136, 138, 139. In some embodiments, the glazed layer 114 may be remelted to at least partially fill the one or more slots 112 or the one or more slots 132, 134, 136, 138, 139 (shown in FIGS. 10, 11A-11D and 16). In some embodiments, the remelting process may be performed using the laser 188 (e.g., of the laser ablation apparatus 150 shown in FIG. 9).

In the illustrated embodiment of FIG. 16, the glazed layer 114 is cut or at least partially heated using the laser 188, however, any other suitable means may be chosen for cutting/heating the glazed layer 114 based on application requirements. In some embodiments, appropriate operating parameters for the laser 188 may be chosen for obtaining the coated article 100 described with reference to FIGS. 4B and 4C. For example, operating parameters may be controlled by decreasing an energy density of the laser 188 during the remelting process by either increasing a scanning speed of the laser 188 or increasing a diameter of the laser 188.

The glazed layer 114 may reduce a surface roughness of the protective coating 106 and may improve its tribological properties. Additionally, the glazed layer 114 may provide a dense surficial layer resistant to erosion and surface damage, thereby improving mechanical properties of the protective coating 106. Further, the glazed layer 114 may decrease oxygen diffusion through the protective coating 106 due to densification. The glazed layer 114 may further increase reflectance in infrared spectrum range due to densification, thereby improving coating efficiency in terms of radiative heat transfer. In other words, the glazed layer 114 may potentially increase thermal insulation properties of the protective coating 106 against radiation.

Further, the protective coating 106 may exhibit increased thermal insulation due to presence of the plurality of slots 112, 132, 134, 136, 138, 139 within the protective coating 106, covered from the top with the glazed layer 114, which obstructs heat penetration to the plurality of slots 112. Deposition of the CMAS products within the plurality of slots 112 may be obstructed by the glazed layer 114, thereby improving CMAS resistance of the protective coating 106. Thus, the protective coating 106 of the present disclosure may combine advantages of both the techniques, i.e., surface remelting and segmented coatings (or coatings with gaps/slots).

It will be understood that the invention is not limited to the embodiments above described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of forming a protective coating, the method comprising:
   providing a substrate comprising a major surface;
   providing a top coat layer adjacent to the major surface of the substrate, the top coat layer comprising a top coat surface distal to the substrate;
   forming a plurality of slots in the top coat layer, wherein each slot from the plurality of slots extends at least partially from the top coat surface towards the major surface of the substrate; and
   at least partially heating the top coat surface above a threshold temperature, such that:
      a first portion of the top coat layer extending from the top coat surface at least partially melts to form a glazed layer; and
      a second portion of the top coat layer disposed between the glazed layer and the major surface of the substrate is not melted and comprises at least a portion of each of the plurality of slots; wherein
   the glazed layer comprises a glazed external surface, and wherein the glazed layer and the second portion of the top coat layer together form the protective coating having a total thickness from the glazed external surface to the major surface of the substrate, and
   the glazed layer comprises a plurality of cracks disposed within the glazed layer and each crack from the plurality of cracks is at least partially aligned with a corresponding slot from the plurality of slots in a plane normal to the major surface of the substrate.

2. The method of claim 1, further comprising filling at least one slot from the plurality of slots with a filling material prior to at least partially heating the top coat surface.

3. The method of claim 1, wherein at least one slot from the plurality of slots extends from the top coat surface to the major surface of the substrate prior to at least partially heating the top coat surface.

4. The method of claim 1, further comprising providing a bond coat layer between the top coat layer and the major surface of the substrate prior to at least partially heating the top coat surface.

5. The method of claim 4, wherein at least one slot from the plurality of slots extends from the top coat surface to the bond coat layer prior to at least partially heating the top coat surface.

6. The method of claim 1, wherein a density of the glazed layer is greater than a density of the second portion of the top coat layer.

7. A coated article comprising:
a substrate comprising a major surface; and
a protective coating disposed adjacent to the major surface of the substrate, the protective coating comprising:
a top layer disposed adjacent to the major surface of the substrate, the top layer comprising a top major surface distal to the major surface of the substrate and a plurality of slots extending at least partially from the top major surface towards the major surface of the substrate; and
a glazed layer disposed directly adjacent to the top major surface of the top layer and comprising a glazed external surface; wherein
the protective coating has a total thickness from the glazed external surface to the major surface of the substrate,
the glazed layer comprises a plurality of cracks disposed within the glazed layer, and
each crack from the plurality of cracks is at least partially aligned with a corresponding slot from the plurality of slots in a plane normal to the major surface of the substrate.

8. The coated article of claim 7, wherein a density of the glazed layer is greater than a density of the top layer.

9. The coated article of claim 7, further comprising a bond coat layer disposed between the top layer and the major surface of the substrate.

\* \* \* \* \*